United States Patent
Jin et al.

(10) Patent No.: US 12,457,537 B2
(45) Date of Patent: Oct. 28, 2025

(54) COMMUNICATION METHOD AND APPARATUS FOR ACCESSING COMMUNICATION CELLS UNDER EXCEPTION CONDITIONS

(71) Applicant: Huawei Technologies Co., Ltd., Shenzhen (CN)

(72) Inventors: Hui Jin, Shenzhen (CN); Xiaobo Wu, Shenzhen (CN); Yang Xin, Shanghai (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/153,634

(22) Filed: Jan. 12, 2023

(65) Prior Publication Data
US 2023/0171661 A1    Jun. 1, 2023

Related U.S. Application Data

(63) Continuation of application No. PCT/CN2021/104904, filed on Jul. 7, 2021.

(30) Foreign Application Priority Data

Jul. 13, 2020   (CN) .......................... 202010668880.5
Feb. 8, 2021   (CN) .......................... 202110182070.3

(51) Int. Cl.
*H04W 36/08*    (2009.01)
*H04W 36/00*    (2009.01)
*H04W 36/16*    (2009.01)

(52) U.S. Cl.
CPC ....... *H04W 36/08* (2013.01); *H04W 36/0058* (2018.08); *H04W 36/16* (2013.01)

(58) Field of Classification Search
CPC ............ H04W 36/08; H04W 36/0058; H04W 36/16; H04W 36/008375; H04W 36/14; H04W 24/02; H04W 24/10; H04W 52/0258; H04W 52/242; H04W 52/367; H04W 52/50; H04W 52/0216; H04W 52/0212; H04W 48/08; H04W 48/16; H04B 17/328; H04L 5/0046; Y02D 30/70
See application file for complete search history.

(56) References Cited

U.S. PATENT DOCUMENTS

| | | | |
|---|---|---|---|
| 11,595,881 B2* | 2/2023 | Lu | H04W 72/542 |
| 2014/0241285 A1* | 8/2014 | Pang | H04W 74/0833 |
| | | | 370/329 |

(Continued)

FOREIGN PATENT DOCUMENTS

| | | |
|---|---|---|
| CN | 101883374 A | 11/2010 |
| CN | 103096355 A | 5/2013 |

(Continued)

*Primary Examiner* — Robert C Scheibel
(74) *Attorney, Agent, or Firm* — Conley Rose, P.C.

(57) ABSTRACT

A method including a first network element receiving first information reported by a first terminal device. The first information is used to indicate parameter information of an exception when the first terminal device accesses a first cell. The first network element determines configuration information based on the first information. The configuration information includes configuration information for accessing the first cell. The first network element sends the configuration information.

20 Claims, 8 Drawing Sheets

(56) References Cited

U.S. PATENT DOCUMENTS

| | | | |
|---|---|---|---|
| 2016/0366626 A1* | 12/2016 | Krishnamoorthy | ... H04W 36/20 |
| 2019/0349822 A1 | 11/2019 | Kim et al. | |
| 2019/0357065 A1 | 11/2019 | Cho et al. | |
| 2022/0086747 A1* | 3/2022 | Bucknell | ............... H04W 48/18 |
| 2022/0361250 A1* | 11/2022 | Lin | ..................... H04W 74/006 |
| 2022/0369175 A1* | 11/2022 | Li | ..................... H04W 36/0005 |

FOREIGN PATENT DOCUMENTS

| | | |
|---|---|---|
| CN | 106572491 A | 4/2017 |
| CN | 107809780 A | 3/2018 |
| CN | 110913428 A | 3/2020 |
| CN | 110913496 A | 3/2020 |
| WO | 2018106166 A1 | 6/2018 |

\* cited by examiner

COMMUNICATION METHOD AND APPARATUS FOR ACCESSING COMMUNICATION CELLS UNDER EXCEPTION CONDITIONS

CROSS-REFERENCE TO RELATED APPLICATIONS

This is a continuation of International Patent Application No. PCT/CN2021/104904 filed on Jul. 7, 2021, which claims priorities to Chinese Patent Application No. 202010668880.5 filed on Jul. 13, 2020 and Chinese Patent Application No. 202110182070.3 filed on Feb. 8, 2021. All of the aforementioned patent applications are hereby incorporated by reference in their entireties.

TECHNICAL FIELD

This disclosure relates to the communication field, and in particular, to a communication method and apparatus.

BACKGROUND

When a terminal device is not connected to a base station, if the terminal device needs to establish a connection to the base station, the terminal device needs to select a preamble, calculate a transmit power corresponding to the preamble, and attempt to establish the connection to the base station by using the transmit power.

During random access by the terminal device, because the terminal device estimates an uplink path loss based on a downlink path loss, uplink and downlink path loss models at some locations are inconsistent, and the terminal device needs a plurality of attempts to access the base station. Consequently, the terminal device needs high access power consumption and long access duration, affecting user experience.

In addition, with development of communications technologies, data transmission capabilities of wireless networks are sequentially enhanced from a second generation (2G) to a fifth generation (5G). Due to network coverage, a terminal may camp on a relatively low-radio access technology (RAT) cell (for example, a 2G cell or a third generation (3G) cell) in some areas. To provide a better service for a user, the terminal periodically searches for a high-RAT cell (for example, a fourth generation (4G) cell or a 5G cell), to camp on the high-RAT cell. Because power consumption of the terminal increased in a network search process, the terminal continuously prolongs search intervals for the high-RAT cell to reduce the power consumption. Because the network search intervals for the high-RAT cell are prolonged, the terminal needs longer duration to restore from the low-RAT cell to the high-RAT cell. This affects user experience.

SUMMARY

Embodiments of this disclosure provide a communication method and apparatus, to reduce a quantity of attempts made by a terminal device to access a network, and reduce access power consumption and access duration of the terminal device. In addition, duration for the terminal device to reselect or be handed over from a low-RAT cell to a high-RAT cell can be reduced.

According to a first aspect, a communication method is provided. The method includes a first terminal device determines first information when an exception condition is met. The first information is used to indicate parameter information of an exception when the first terminal device accesses a first cell, and the first cell is a cell that serves the first terminal device. The first terminal device reports the first information.

According to the solution provided in this disclosure, the first terminal device determines and reports the first information when the exception condition is met, so that the first network element can determine configuration information based on the first information and send the configuration information to a to-be-accessed second terminal device, and the second terminal device can access a target cell based on the configuration information. This can reduce a quantity of attempts made by the second terminal device to access the target cell, to reduce access power consumption and access duration of the second terminal device. In addition, duration for the second terminal device to reselect or be handed over from a low-RAT cell to a high-RAT cell can be reduced. In other words, a speed of network reselection or handover by the second terminal device in the target cell can be increased.

With reference to the first aspect, in some possible implementations, the exception condition includes at least one of the following:

A quantity of random access attempts made by the first terminal device to access the first cell is greater than or equal to a first threshold.

An actual transmit power at which the first terminal device accesses the first cell is greater than or equal to a second threshold.

The first cell is the cell in the first RAT, duration in which the first terminal device reselects or is handed over from the second cell in the second RAT to the first cell is greater than or equal to a third threshold, and a generation of communication in the second RAT is lower than a generation of communication in the first RAT.

According to the solution provided in this disclosure, the first terminal device determines and reports the first information when the exception condition is met. The exception condition may include: The quantity of random access attempts made by the first terminal device to access the first cell, the actual transmit power at which the first terminal device accesses the first cell, and the duration in which the first terminal device reselects or is handed over from the second cell in the second RAT to the first cell in the first RAT are greater than or equal to a specific threshold, so that when the first network element determines the configuration information, accuracy can be improved. Further, the quantity of attempts made by the second terminal device to access the target cell can be reduced, to reduce the access power consumption and the access duration of the second terminal device. In addition, duration of network reselection or handover by the second terminal device in the target cell can be reduced.

With reference to the first aspect, in some possible implementations, the first information includes at least one of the following: an identity (ID) of the first cell, a tracking area (TA) of the first cell, a reference signal received power (RSRP) of the first terminal device in the first cell, IDs of a plurality of neighboring cells of the first cell, RSRPs of the first terminal device in the plurality of neighboring cells of the first cell, a downlink path loss compensation value at which the first terminal device accesses the first cell, a parameter for calculating the downlink path loss compensation value, the actual transmit power at which the first terminal device accesses the first cell, location information indicating that the first terminal device accesses the first cell, location information indicating that the first terminal device reselects or is handed over from the second cell in the second RAT to the first cell in the first RAT, or the duration in which the first terminal device reselects or is handed over from the second cell in the second RAT to the first cell in the first RAT.

With reference to the first aspect, in some possible implementations, the method further includes:

The first terminal device receives an exception report configuration. The exception report configuration indicates the first terminal device to report the first information when the exception condition is met.

According to a second aspect, a communication method is provided. The method includes: A first network element receives first information reported by a first terminal device. The first information is used to indicate parameter information of an exception when the first terminal device accesses a first cell, and the first cell is a cell that serves the first terminal device. The first network element determines configuration information based on the first information. The configuration information includes configuration information for accessing the first cell. The first network element sends the configuration information.

According to the solution provided in this disclosure, the first terminal device determines and reports the first information when an exception condition is met. The first network element can determine the configuration information based on the first information and send the configuration information to a to-be-accessed second terminal device, so that the second terminal device can access a target cell (the target cell is the first cell) based on the configuration information. This can reduce a quantity of attempts made by the second terminal device to access the target cell, to reduce access power consumption and access duration of the second terminal device. In addition, duration of network reselection or handover by the second terminal device can be reduced. In other words, a speed of network reselection or handover by the second terminal device in the target cell can be increased.

With reference to the second aspect, in some possible implementations, the configuration information of the target cell includes configuration information for initially accessing the first cell.

Alternatively, the first cell is a cell in a first RAT, the configuration information includes configuration information for reselecting or being handed over from a second cell in a second RAT to the first cell, and a generation of communication in the second RAT is lower than a generation of communication in the first RAT.

With reference to the second aspect, in some possible implementations, that a first network element receives first information reported by a first terminal device includes:

The first network element receives the first information reported by the first terminal device when the exception condition is met.

The exception condition includes at least one of the following:

A quantity of random access attempts made by the first terminal device to access the first cell is greater than or equal to a first threshold.

An actual transmit power at which the first terminal device accesses the first cell is greater than or equal to a second threshold.

The first cell is the cell in the first RAT, duration in which the first terminal device reselects or is handed over from the second cell in the second RAT to the first cell is greater than or equal to a third threshold, and a generation of communication in the second RAT is lower than a generation of communication in the first RAT.

According to the solution provided in this disclosure, the first terminal device determines and reports the first information when the exception condition is met. The exception condition may include: The quantity of random access attempts made by the first terminal device to access the first cell, the actual transmit power at which the first terminal device accesses the first cell, and the duration in which the first terminal device reselects or is handed over from the second cell in the second RAT to the first cell in the first RAT are greater than or equal to a specific threshold, so that when the first network element determines the configuration information, accuracy can be improved. Further, the quantity of attempts made by the second terminal device to access the target cell can be reduced, to reduce the access power consumption and the access duration of the second terminal device. In addition, duration of network reselection or handover by the second terminal device in the target cell can be reduced.

With reference to the second aspect, in some possible implementations, the first information includes at least one of the following: an ID of the first cell, a TA of the first cell, a RSRP of the first terminal device in the first cell, IDs of a plurality of neighboring cells of the first cell, RSRPs of the first terminal device in the plurality of neighboring cells, a downlink path loss compensation value at which the first terminal device accesses the first cell, a parameter for calculating the downlink path loss compensation value, the actual transmit power at which the first terminal device accesses the first cell, location information indicating that the first terminal device accesses the first cell, location information indicating that the first terminal device reselects or is handed over from the second cell in the second RAT to the first cell in the first RAT, or the duration in which the first terminal device reselects or is handed over from the second cell in the second RAT to the first cell in the first RAT.

According to the solution provided in this disclosure, the first information reported by the first terminal device includes at least one piece of the foregoing information, so that the quantity of attempts made by the second terminal device to access the target cell can be further reduced, to reduce the access power consumption and the access duration of the second terminal device. In addition, the duration of network reselection or handover by the second terminal device in the target cell can be reduced.

With reference to the second aspect, in some possible implementations, the configuration information includes a target transmit power or a target path loss compensation value at which the first terminal device accesses the first cell.

The first cell is the cell in the first RAT, and the configuration information includes a target start occasion on which the first terminal device reselects or is handed over from the second cell in the second RAT to the first cell or a target network search period in which the first terminal device reselects or is handed over from the second cell in the second RAT to the first cell.

With reference to the second aspect, in some possible implementations, if the configuration information includes the target transmit power, that the first network element determines configuration information based on the first information includes:

The first network element determines the target transmit power based on the actual transmit power at which the first terminal device successfully accesses the first cell.

According to the solution provided in this disclosure, the first network element may determine the target transmit power based on the actual transmit power reported by the first terminal device, so that the second terminal device can access the target cell based on the target transmit power. This can reduce the quantity of attempts made by the second terminal device to access the target cell, to reduce the access power consumption and the access duration of the second terminal device.

With reference to the second aspect, in some possible implementations, if the configuration information includes the target transmit power, the method further includes:

The first network element sends a request message to a second network element. The request message is used to request the second network element to send an actual receive power of a base station corresponding to the first cell when the first terminal device successfully accesses the first cell.

The first network element receives the actual receive power at which the first terminal device accesses the base station corresponding to the first cell.

That the first network element determines configuration information based on the first information includes:

The first network element determines the target transmit power based on a difference between the actual receive power and the actual transmit power at which the first terminal device accesses the first cell.

According to the solution provided in this disclosure, the first network element may determine the target transmit power based on the actual transmit power of the first terminal device and the actual receive power of the corresponding base station when the first terminal device successfully accesses the first cell, so that the second terminal device can access the target cell based on the target transmit power. This can reduce the quantity of attempts made by the second terminal device to access the target cell, to reduce the access power consumption and the access duration of the second terminal device.

With reference to the second aspect, in some possible implementations, if the configuration information includes the target path loss compensation value, that the first network element determines configuration information based on the first information includes:

The first network element determines the target path loss compensation value based on the downlink path loss compensation value at which the first terminal device accesses the first cell or the parameter for calculating the downlink path loss compensation value.

According to the solution provided in this disclosure, the first network element may determine the target path loss compensation value based on the downlink path loss compensation value, so that the second terminal device can access the target cell based on the target path loss compensation value. This can reduce the quantity of attempts made by the second terminal device to access the target cell, to reduce the access power consumption and the access duration of the second terminal device.

With reference to the second aspect, in some possible implementations, if the configuration information includes the target start occasion, that the first network element determines configuration information based on the first information includes:

The first network element determines, based on the first information, a first power range of the first terminal device in the first cell in the first RAT and a second power range of the first terminal device in the second cell in the second RAT.

When a second terminal device accesses the first cell, an RSRP in the first cell falls within the first power range, and an RSRP in the second cell in the second RAT falls within the second power range, the first network element determines that a current occasion is the target start occasion. The target start occasion is an occasion on which the second terminal device starts first-RAT network search.

According to the solution provided in this disclosure, the first network element may determine the target start occasion based on the power range of the second cell in the second RAT and the power range of the first cell in the first RAT that are reported by the first terminal device, so that the second terminal device can start high-RAT network search when the power range of the second cell in the second RAT and the power range of the target cell in a first RAT are met, to reselect or be handed over to the target cell in the first RAT. This can reduce the duration of network reselection or handover by the second terminal device in the target cell.

With reference to the second aspect, in some possible implementations, if the configuration information includes the target network search period, that the first network element determines configuration information based on the first information includes:

The first network element determines the target network search period based on the duration in which the first terminal device reselects or is handed over from the second cell in the second RAT to the first cell.

According to the solution provided in this disclosure, the first network element may determine the target network search period based on the duration reported by the first terminal device, so that the second terminal device can reselect or be handed over to the target cell in the first RAT based on the target network search period. This can reduce the duration of network reselection or handover by the second terminal device in the target cell.

With reference to the second aspect, in some possible implementations, the method further includes:

The first network element sends an ID of the second cell and the ID of the first cell to the second network element.

Second information sent by the second network element is received. The second information includes information that is about whether the second cell and the first cell are neighboring cells and that is determined by the second network element.

That the first network element determines configuration information based on the first information includes:

If the second information includes the information that the second cell and the first cell are neighboring cells, the first network element determines the configuration information based on the first information.

According to the solution provided in this disclosure, the second network element determines whether the second cell in the second RAT is neighboring to the first cell in the first RAT. When determining that the second cell in the second RAT is neighboring to the first cell in the first RAT, the first network element determines the configuration information based on the first information. This can further reduce the duration of network reselection or handover by the second terminal device in the target cell.

With reference to the second aspect, in some possible implementations, the configuration information further includes a target area, and the method further includes:

The first network element determines the target area based on the RSRP of the first terminal device in the first cell and an RSRP of the first terminal device in a neighboring cell of the first cell. The target area indicates a problem area in the first cell.

Alternatively, the first network element determines the target area based on the location information indicating that the first terminal device reselects or is handed over from the second cell in the second RAT to the first cell.

According to the solution provided in this disclosure, the first network element may determine the target area based on the first information reported by the first terminal device, so that when the second terminal device is located in the target area, the second terminal device may access the target cell based on target information. This can reduce the quantity of attempts made by the second terminal device to access the target cell, to reduce the access power consumption and the access duration of the second terminal device.

With reference to the second aspect, in some possible implementations, the method further includes:

The first network element performs exception report configuration on the first terminal device. The exception report configuration indicates the first terminal device to report the first information to the first network element when the exception condition is met.

With reference to the second aspect, in some possible implementations, the method further includes:

The first network element receives a message that a third network element subscribes to the exception report configuration from the first network element.

According to a third aspect, a communication method is provided. The method includes a second terminal device receives configuration information. The configuration information includes configuration information for accessing a target cell. The target cell is a first cell. The configuration information includes a target transmit power or a target path loss compensation value at which a first terminal device accesses the first cell, or a target start occasion on which the first terminal device reselects or is handed over from a second cell in a second RAT to the first cell in a first RAT or a target network search period in which the first terminal device reselects or is handed over from a second cell in a second RAT to the first cell in a first RAT. A generation of communication in the second RAT is lower than a generation of communication in the first RAT. The second terminal device accesses the target cell based on the configuration information.

According to the solution provided in this disclosure, the second terminal device receives the configuration information, and may access the target cell based on the configuration information. This can reduce the quantity of attempts made by the second terminal device to access the target cell, to reduce the access power consumption and the access duration of the second terminal device. In addition, the duration of network reselection or handover by the second terminal device in the target cell can be reduced.

With reference to the third aspect, in some possible implementations, the configuration information of the target cell includes configuration information for initially accessing the target cell. Alternatively, the configuration information of the target cell includes configuration information for reselecting or being handed over from the second cell in the second RAT to the target cell in the first RAT.

With reference to the third aspect, in some possible implementations, the configuration information further includes a target area, and that the second terminal device accesses the target cell based on the configuration information includes:

If the second terminal device is located in the target area, the second terminal device accesses the target cell based on the configuration information.

According to the solution provided in this disclosure, when the second terminal device is located in the target area, the second terminal device may access the target cell based on received target information. This can reduce the quantity of attempts made by the second terminal device to access the target cell, to reduce the access power consumption and the access duration of the second terminal device.

According to a fourth aspect, a communication apparatus is provided. For beneficial effects, refer to the descriptions of the first aspect. Details are not described herein again. The communication apparatus has a function of implementing behavior in the method embodiment in the first aspect. The function may be implemented by hardware, or may be implemented by hardware executing corresponding software. The hardware includes one or more units corresponding to the foregoing functions. In a possible design, the communication apparatus includes: a processing module, configured to determine first information when an exception condition is met, where the first information is used to indicate parameter information of an exception when the first terminal device accesses a first cell, and the first cell is a cell that serves the first terminal device; and a transceiver module, configured to report the first information. These modules may perform corresponding functions in the method example in the first aspect. For details, refer to the detailed descriptions in the method example. Details are not described herein again.

According to a fifth aspect, a communication apparatus is provided. For beneficial effects, refer to the descriptions of the second aspect. Details are not described herein again. The communication apparatus has a function of implementing behavior in the method example in the second aspect. The function may be implemented by hardware, or may be implemented by hardware executing corresponding software. The hardware or the software includes one or more units corresponding to the foregoing functions. In a possible design, the communication apparatus includes: a transceiver module, configured to receive first information reported by a first terminal device, where the first information is used to indicate parameter information of an exception when the first terminal device accesses a first cell; and a processing module, configured to determine configuration information based on the first information, where the configuration information includes configuration information for accessing the first cell. The transceiver module is further configured to send the configuration information. These modules may perform corresponding functions in the method example in the second aspect. For details, refer to the detailed descriptions in the method example. Details are not described herein again.

According to a sixth aspect, a communication apparatus is provided. For beneficial effects, refer to the description in the third aspect. Details are not described herein again. The communication apparatus has functions of implementing behavior in the method example in the third aspect. The function may be implemented by hardware, or may be implemented by hardware executing corresponding software. The hardware or the software includes one or more units corresponding to the foregoing functions. In a possible design, the communication apparatus includes: a transceiver module, configured to receive configuration information, where the configuration information includes configuration information for accessing a target cell, the target cell is a first cell, the configuration information includes a target transmit power or a target path loss compensation value at which a first terminal device accesses the first cell, or a target start occasion on which the first terminal device reselects or is handed over from a second cell in a second RAT to the first cell in a first RAT or a target network search period in which the first terminal device reselects or is handed over from a second cell in a second RAT to the first cell in a first RAT, and a generation of communication in the second RAT is lower than a generation of communication in the first RAT; and a processing module, configured to access the target cell based on the configuration information. These modules may perform corresponding functions in the method example in the third aspect. For details, refer to the detailed descriptions in the method example. Details are not described herein again.

According to a seventh aspect, a communication apparatus is provided. The communication apparatus may be the terminal device in the foregoing method embodiments, or a chip disposed in the terminal device. The communication apparatus includes a transceiver and a processor. Optionally, the communication apparatus further includes a memory. The processor is configured to control the transceiver to send and receive a signal. The memory is configured to store a computer program. The processor is configured to invoke the computer program from the memory and run the computer program, to enable the communication apparatus to perform the method according to any one of the first aspect, the third aspect, or the possible implementations of the first aspect or the third aspect.

According to an eighth aspect, a communication apparatus is provided. The communication apparatus may be the network device in the foregoing method embodiment, or a chip disposed in the network device. The communication apparatus includes a transceiver and a processor. Optionally, the communication apparatus further includes a memory. The processor is configured to control the transceiver to send and receive a signal. The memory is configured to store a computer program. The processor is configured to invoke the computer program from the memory and run the computer program, to enable the communication apparatus to perform the method according to any one of the possible implementations of the second aspect.

According to a ninth aspect, a computer program product is provided. The computer program product includes computer program code. When the computer program code is run, the method performed by the terminal device in the foregoing aspects is performed.

According to a tenth aspect, a computer program product is provided. The computer program product includes computer program code. When the computer program code is run, the method performed by the network device in the foregoing aspects is performed.

According to an eleventh aspect, this disclosure provides a chip system. The chip system includes a processor, configured to implement functions of the terminal device in the methods in the foregoing aspects. In a possible design, the chip system further includes a memory, configured to store program instructions and/or data. The chip system may include a chip, or may include a chip and another discrete component.

According to a twelfth aspect, this disclosure provides a chip system. The chip system includes a processor, configured to implement the functions of the network device in the method in the foregoing aspects. In a possible design, the chip system further includes a memory, configured to store program instructions and/or data. The chip system may include a chip, or may include a chip and another discrete component.

According to a thirteenth aspect, this disclosure provides a computer-readable storage medium. The computer-readable storage medium stores a computer program. When the computer program is run, the methods performed by the terminal device in the foregoing aspects are implemented.

According to a fourteenth aspect, this disclosure provides a computer-readable storage medium. The computer-readable storage medium stores a computer program. When the computer program is run, the methods performed by the network device in the foregoing aspects are implemented.

DESCRIPTION OF EMBODIMENTS

In this specification, the claims, and the accompanying drawings of this disclosure, the terms "first", "second", "third", and the like are intended to distinguish between different objects but do not limit a particular order.

In addition, in embodiments of this disclosure, the word "exemplary" or "for example" is used to represent giving an example, an illustration, or a description. Any embodiment or design scheme described as an "example" or "for example" in embodiments of this disclosure should not be explained as being more preferred or having more advantages than another embodiment or design scheme. Specifically, use of the word "example", "for example", or the like is intended to present a related concept in a specific manner.

Figure 1:
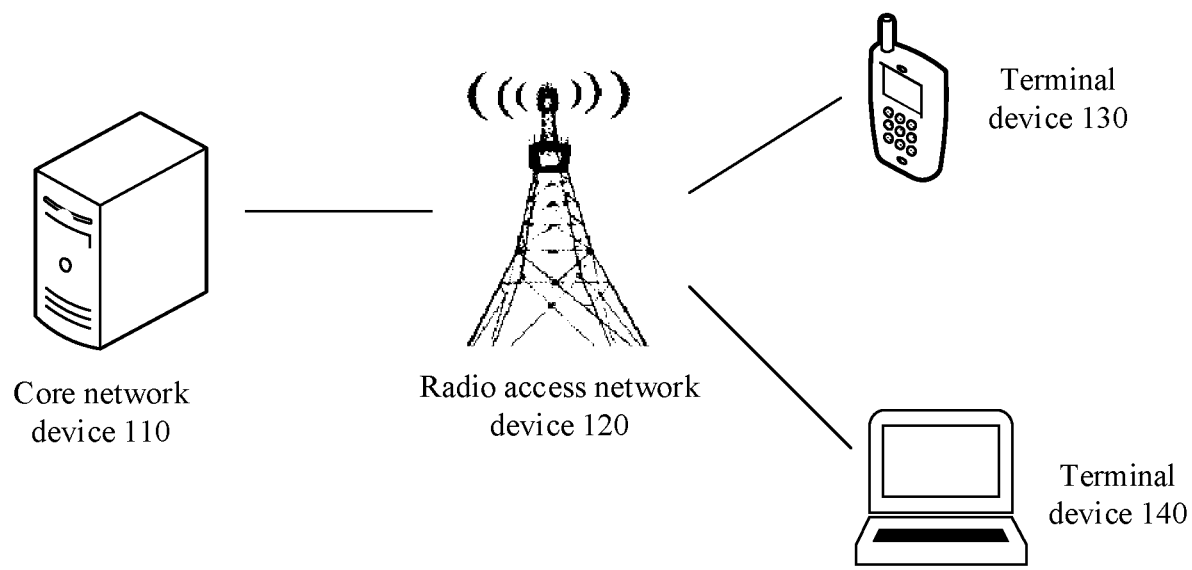
FIG. 1 is a schematic diagram based on a communication system according to an embodiment of this disclosure.

FIG. 1 is a schematic diagram of an architecture of a mobile communication system to which an embodiment of this disclosure is applied. As shown in FIG. 1, the mobile communication system includes a core network device 110, a radio access network device 120, and at least one terminal device (for example, a terminal device 130 and a terminal device 140 shown in FIG. 1). The terminal device is connected to the radio access network device in a wireless manner, and the radio access network device is connected to the core network device in a wireless or wired manner. The core network device and the radio access network device may be independent and different physical devices, or a function of the core network device and a logical function of the radio access network device may be integrated into a same physical device, or a part of functions of the core network device and a part of functions of the radio access network device may be integrated into one physical device. The terminal device may be located at a fixed location, or may be mobile. FIG. 1 is only a schematic diagram. The communication system may further include another network device, for example, may further include a wireless relay device and a wireless backhaul device, which are not shown in FIG. 1. Quantities of core network devices, radio access network devices, and terminal devices included in the mobile communication system are not limited in this embodiment of this disclosure.

The radio access network device is an access device that is used by the terminal device to access the mobile communication system in a wireless manner. The radio access network device may be a base station, an evolved NodeB (eNodeB), a transmission reception point (TRP), a next generation NodeB (gNB) in a 5G mobile communication system, a base station in a future mobile communication system, an access node in a Wi-Fi system, or the like. Alternatively, the radio access network device may be a module or a unit that completes a part of functions of a base station, for example, may be a central unit (CU) or a distributed unit (DU). A specific technology and a specific device form that are used by the radio access network device are not limited in embodiments of this disclosure. In this disclosure, the radio access network device is referred to as a network device for short. Unless otherwise specified, network devices are all radio access network devices. For example, the radio access network device 120 may be referred to as a network device 120. The radio access network device 130 may be referred to as a network device 130.

The terminal device may also be referred to as a terminal, user equipment (UE), a mobile station, a mobile terminal, or the like. The terminal device may be a mobile phone, a tablet computer (Pad), a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, a communication module (for example, a modem chip) in a terminal, and the like. A specific technology and a specific device form that are used by the terminal device are not limited in embodiments of this disclosure.

It should be understood that, in embodiments of this disclosure, the terminal device or the network device (for example, the core network device or the radio access network device) includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this disclosure is not particularly limited in embodiments of this disclosure, provided that a program that records code of the method provided in embodiments of this disclosure can be run to perform communication according to the method provided in embodiments of this disclosure. For example, the execution body of the method provided in embodiments of this disclosure may be the terminal device or the network device, or a functional module that can invoke and execute the program in the terminal device or the network device.

The network device and the terminal device may be deployed on the land, including an indoor device, an outdoor device, a handheld device, or a vehicle-mounted device; may be deployed on the water surface; or may be deployed on a plane, a balloon, and a satellite in the air. An application scenario of the network device and the terminal device is not limited in embodiments of this disclosure.

It should be understood that sequence numbers of the processes do not mean an execution sequence in various embodiments of this disclosure. The execution sequence of the processes should be determined based on functions and internal logic of the processes, and should not be construed as any limitation on implementation processes of embodiments of this disclosure.

It should be further noted that in embodiments of this disclosure, "presetting", "predefining", or the like may be implemented by prestoring corresponding code or a table in a device (for example, including a terminal device and a network device), or in another manner that may be used to indicate related information. A specific implementation of "presetting", "predefining", or the like is not limited in this disclosure, for example, a preset rule or a preset constant in embodiments of this disclosure.

It should be noted that the term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

This disclosure may be applied to a 5G or 4G system. A network data analytics function (NWDAF) network element is introduced to the 5G or 4G system, and the network element may interact with a network element in another core network to learn a network status.

For example, the NWDAF may analyze and identify an abnormal state of the terminal device. For example, the NWDAF may identify that the terminal device frequently performs ping-pong handovers between two cells, or the terminal device frequently requests a service.

When the terminal device is not connected to the base station, if the terminal device needs to establish a connection to the base station, the terminal device needs to select a preamble, calculate a transmit power corresponding to the preamble, and attempt to establish the connection to the base station by using the transmit power.

A random access power may be obtained by using the following formula (1):

$$P_{PRACH} = \min\{P_{CMAX}, P_{PRACHtarget} + PL\} \quad (1)$$

$P_{CMAX}$ represents a maximum transmit power of the terminal device, $P_{PRACHtarget}$ represents a target receive power of the base station, and PL represents a path loss. $P_{PRACHtarget}$ and PL may be obtained by using a formula (2) and a formula (3) respectively.

Target receive power $P_{PRACHtarget}$ of the base station:

$$P_{PPRACHtarget} = \text{prembleReceivedTargetPower} + \text{DELTA\_PREAMBLE} + (\text{PREAMBLE\_POWER\_RAMPING\_COUNTER} - 1) * \text{PREAMBLE\_POWER\_RAMPING\_STEP} \quad (2)$$

prembleReceivedTargetPower represents a received power expected by the base station, and may be obtained from a parameter 'preambleReceivedTargetPower' of a received system broadcast message sent by the base station.

DELTA_PREAMBLE represents power offsets of different preambles, and may be obtained by using Table 1.

TABLE 1

| Preamble Format | DELTA_PREAMBLE values |
| --- | --- |
| 0 | 0 db |
| 1 | −3 dB |
| 2 | −6 dB |
| 3 | 0 dB |

PREAMBLE_POWER_RAMPING_COUNTER represents a quantity of access attempts and has an initial value of 1, and one is added for each retransmission. A maximum quantity of attempts may be defined by a parameter 'preambleTransMax' of the system broadcast message sent by the base station.

PREAMBLE_POWER_RAMPING_STEP represents a compensation value added for each retransmission, and may be obtained by using a parameter 'powerRampingStep' of the received system broadcast message sent by the base station.

Path loss PL:

$$PL = \text{reference signal power} - \text{actually received reference signal power} \quad (3)$$

The reference signal power may be obtained based on ss-PBCH-BlockPower of the received system broadcast message sent by the base station.

The actually received reference signal power may be obtained based on a signal received by the terminal device.

For example, it is assumed that the system broadcast message of the base station is as follows.

```
rach-ConfigGeneric
{
    prach-ConfigurationIndex 2,
    msg1-FDM one,
    msg1-FrequencyStart 2,
    zeroCorrelationZoneConfig 6,
    preambleReceivedTargetPower −100,
    preambleTransMax n10,
    powerRampingStep dB4,
    ra-ResponseWindow sl20
},
``` ss-PBCH-BlockPower −8

It is assumed that in this case, a signal received power is −94 decibel-milliwatts (dBm).

If a selected preamble is 0, according to the foregoing formulas (1), (2), and (3), initial transmit power of terminal device=−100+(0)+(1−1)*4+[−8−(−94)]=−14 dBm.

Transmit power for second attempt=−100+(0)+(2−1)*4+[−8−(−94)]=−10 dBm.

Transmit power for third attempt=−100+(0)+(3−1)*4+[−8−(−94)]=−6 dBm.

The rest can be deduced by analogy until the transmit power of the terminal device meets an access power expected by the base station.

During random access by the terminal device, in one aspect, because the terminal device estimates an uplink path loss based on a downlink path loss, uplink and downlink path loss models at some locations are inconsistent, and the terminal device needs a plurality of attempts to access the base station. Consequently, the terminal device needs high access power consumption and long access duration.

In addition, with development of communications technologies, data transmission capabilities of wireless networks are sequentially enhanced from 2G to 5G. Due to network coverage, a terminal may camp on a relatively low-RAT cell (for example, a 2G cell or a 3G cell) in some areas. To provide a better service for a user, the terminal periodically searches for a high-RAT cell (for example, a 4G cell or a 5G cell), to camp on the high-RAT cell. Because power consumption of the terminal increased in a network search process, the terminal continuously prolongs search intervals for the high-RAT cell to reduce the power consumption. Because the network search intervals for the high-RAT cell are prolonged, the terminal needs longer duration to restore from the low-RAT cell to the high-RAT cell. This affects user experience.

This disclosure provides a communication method, to reduce a quantity of attempts made by a terminal device to access a network, and reduce access power consumption and access duration of the terminal device. In addition, duration for the terminal device to reselect or be handed over from a low-RAT cell to a high-RAT cell can be reduced.

Figure 2:
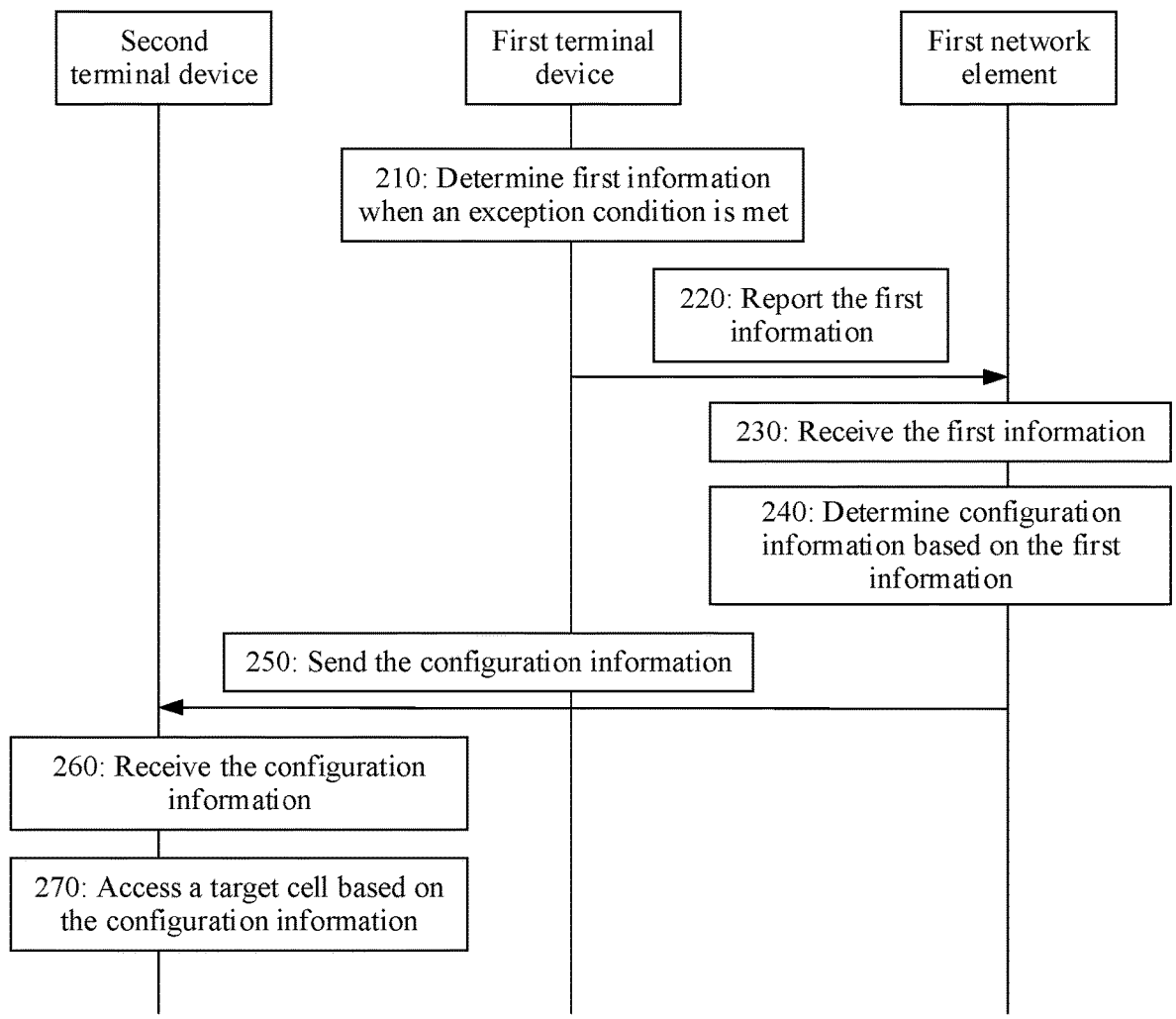
FIG. 2 is a schematic flowchart of a communication method according to an embodiment of this disclosure.

FIG. 2 shows a communication method 200 according to an embodiment of this disclosure. The method 200 may be performed by a terminal device and a network device, or may be performed by a chip in the terminal device and a chip in the network device. The communication method 200 may include the following steps.

210: A first terminal device determines first information when an exception condition is met. The first information is used to indicate parameter information of an exception when the first terminal device accesses a first cell, and the first cell is a cell that serves the first terminal device.

220: The first terminal device reports the first information.

The first terminal device in this embodiment of this disclosure includes at least one terminal device. The first terminal device may be any terminal device, provided that a terminal device can determine and report the first information when the exception condition is met (for the exception condition, refer to the following descriptions). This is not limited.

230: A first network element receives the first information reported by the first terminal device.

The first network element in this embodiment of this disclosure may be any one of an NWDAF, an access and mobility management function (AMF) network element, a session management function (SMF) network element, and an operation, administration and maintenance (OAM) network element, or a combination thereof. In other words, the first network element may be one of the NWDAF, the AMF, the SMF, and the OAM; may be a combination of any two of the NWDAF, the AMF, the SMF, and the OAM, for example, a combination of the NWDAF and the AMF; may be a combination of three network elements: the NWDAF, the AMF, and the SMF; or may be a combination of four network elements: the NWDAF, the AMF, the SMF, and the OAM. This is not limited.

It should be noted that if the first network element is any one of the foregoing network elements, the first network element may independently implement the solutions in this disclosure, or may jointly implement the solutions in this disclosure with other network elements (for example, a second network element and a third network element in the following descriptions).

240: The first network element determines configuration information based on the first information. The configuration information includes configuration information for accessing the first cell.

250: The first network element sends the configuration information.

In this embodiment of this disclosure, the first network element may directly send the configuration information to the second terminal device, or may indirectly send the configuration information to the second terminal device, for example, may send the configuration information by using another network element (for example, the AMF). This is not specifically limited in this disclosure.

260: A second terminal device receives configuration information. The configuration information includes configuration information for accessing a target cell. The target cell is a first cell. The configuration information includes a target transmit power or a target path loss compensation value at which a first terminal device accesses the first cell, or a target start occasion on which the first terminal device reselects or is handed over from a second cell in a second RAT to the first cell in a first RAT or a target network search period in which the first terminal device reselects or is handed over from a second cell in a second RAT to the first cell in a first RAT.

Correspondingly, the second terminal device may directly receive the configuration information sent by the first network element, or may receive the configuration information sent by the first network element by using another network element.

It may be understood that, in this embodiment of this disclosure, the first cell may include one or more cells. If the first cell includes one cell, the target cell in this disclosure is the cell. If the first cell includes a plurality of cells, the target cell in this disclosure is at least one of the plurality of cells. It should be noted that when the first cell includes the plurality of cells, if the second terminal device includes one terminal device, the target cell may be one of the plurality of cells; or if the second terminal device includes two terminal devices, the target cell may be one or two of the plurality of cells. This is not limited.

In other words, if there is one cell that serves the first terminal device, after receiving the first information sent by the first terminal device, the first network element may determine, based on the first information, configuration information for accessing the cell. The cell is the target cell in this disclosure. If there are a plurality of cells that serve the first terminal device, after receiving the first information sent by the first terminal device, the first network element may determine, based on the first information, configuration information for accessing the plurality of cells. At least one of the plurality of cells is the target cell in this disclosure. Subsequently, if the terminal device is ready to access the target cell, the terminal device may access the target cell based on the configuration information.

270: The second terminal device accesses the target cell based on the configuration information.

In this embodiment of this disclosure, after receiving the configuration information, the second terminal device may access the target cell based on the configuration information. The configuration information includes the target transmit power or the target path loss compensation value for accessing the target cell, or the target start occasion or the target network search period for reselecting or being handed over from the second cell in the second RAT to the target cell in the first RAT.

According to the solution provided in this disclosure, the first terminal device determines and reports the first information when the exception condition is met. The first network element can determine the configuration information based on the first information and send the configuration information to a to-be-accessed second terminal device, so that the second terminal device can access the target cell (the target cell is the first cell) based on the configuration information. This can reduce a quantity of attempts made by the second terminal device to access the target cell, to reduce access power consumption and access duration of the second terminal device. In addition, duration for the second terminal device to reselect or be handed over from a low-RAT cell to a high-RAT cell can be reduced. In other words, a speed of network reselection or handover by the second terminal device in the target cell can be increased.

Optionally, in some embodiments, the configuration information of the first cell includes configuration information for initially accessing the first cell. Alternatively, the first cell is a cell in the first RAT, the configuration information includes configuration information for reselecting or being handed over from the second cell in the second RAT to the first cell, and a generation of communication in the second RAT is lower than a generation of communication in the first RAT.

The configuration information of the first cell in this embodiment of this disclosure may include: the configuration information for initially accessing the first cell, and the configuration information for reselecting or being handed over from the second cell in the second RAT to the first cell in the first RAT.

If the configuration information of the first cell includes the configuration information for initially accessing the first cell, the configuration information may include the target transmit power or the target path loss compensation value at which the first terminal device accesses the first cell. If the configuration information of the first cell includes the configuration information for reselecting or being handed over from the second cell in the second RAT to the first cell in the first RAT, the configuration information may include the target start occasion on which the first terminal device reselects or is handed over from the second cell in the second RAT to the first cell in the first RAT or the target network search period in which the first terminal device reselects or is handed over from the second cell in the second RAT to the first cell in the first RAT.

It is mentioned above that the first terminal device determines the first information when the exception condition is met. The exception condition may include one or more conditions. For details, refer to the following descriptions.

The exception condition includes at least one of the following:

A quantity of random access attempts made by the first terminal device to access the first cell is greater than or equal to a first threshold.

An actual transmit power at which the first terminal device accesses the first cell is greater than or equal to a second threshold.

The first cell is the cell in the first RAT, duration in which the first terminal device reselects or is handed over from the second cell in the second RAT to the first cell is greater than or equal to a third threshold, and a generation of communication in the second RAT is lower than a generation of communication in the first RAT.

For example, the exception condition is that a quantity of random access attempts made by the first terminal device to access a cell is greater than or equal to the first threshold. It is assumed that 10 terminal devices are ready to access the cell, and the first threshold is 5, if a quantity of access times of at least one of the 10 terminal devices in the cell is greater than or equal to 5, for example, if a quantity of access times of seven terminal devices in the cell is 5, the seven terminal devices may report parameter information of an exception in the cell.

For example, the exception condition is that a transmit power of the first terminal device in a cell is greater than or equal to the second threshold. It is assumed that 10 terminal devices are ready to access the cell, and the second threshold is −20 dBm, if an actual transmit power of at least one of the 10 terminal devices in the cell is greater than or equal to −20 dBm, for example, if an actual transmit power at which eight terminal devices access the cell is −10 dBm, the eight terminal devices may report parameter information of an exception in the cell.

It should be understood that the actual transmit power in this embodiment of this disclosure is a transmit power when the terminal device successfully accesses a cell. In some embodiments, the actual transmit power may also be referred to as an access power of the terminal device.

For example, the exception condition is that the duration in which the first terminal device reselects or is handed over from the second cell in the second RAT to the first cell is greater than or equal to the third threshold. It is assumed that 10 terminal devices are ready to reselect or be handed over from the second cell in the second RAT to the first cell, and the third threshold is 5 milliseconds (ms), if duration in which at least one of the 10 terminal devices reselects or is handed over from the second cell in the second RAT to the first cell is greater than or equal to 5 ms, for example, if duration in which five terminal devices reselect or are handed over from the second cell in the second RAT to the first cell is 6 ms, the five terminal devices may report parameter information of an exception in the second cell and the first cell.

It should be understood that the foregoing values are only an example for description, may alternatively be other values, and should not be construed as a particular limitation on this disclosure.

It should be noted that the second cell in the second RAT in this embodiment of this disclosure may be a 2G cell or a 3G cell (which may also be referred to as a low-RAT cell), and the first cell in the first RAT may be a 4G cell or a 5G cell (which may also be referred to as a high-RAT cell).

It should be further noted that the first threshold, the second threshold, and the third threshold in this embodiment of this disclosure may be configured by the network device for the terminal device, may be defined according to a standard, or may be preset. The first threshold, the second threshold, and the third threshold may be fixed values, or may be dynamically adjusted values. This is not limited.

According to the solution provided in this disclosure, the first terminal device determines and reports the first information when the exception condition is met. The exception condition may include: The quantity of random access attempts made by the first terminal device to access the first cell, the actual transmit power at which the first terminal device accesses the first cell, and the duration in which the first terminal device reselects or is handed over from the second cell in the second RAT to the first cell in the first RAT are greater than or equal to a specific threshold, so that when the first network element determines the configuration information, accuracy can be improved. Further, the quantity of attempts made by the second terminal device to access the target cell can be reduced, to reduce the access power consumption and the access duration of the second terminal device. In addition, duration of network reselection or handover by the second terminal device in the target cell can be reduced.

It is further mentioned above that the first terminal device determines the first information when the exception condition is met. The first information may include one or more pieces of information. For details, refer to the following descriptions.

The first information includes at least one of the following: an ID of the first cell, a TA of the first cell, an RSRP of the first terminal device in the first cell, IDs of a plurality of neighboring cells of the first cell, RSRPs of the first terminal device in the plurality of neighboring cells, a downlink path loss compensation value at which the first terminal device accesses the first cell, a parameter for calculating the downlink path loss compensation value, the actual transmit power at which the first terminal device accesses the first cell, location information indicating that the first terminal device accesses the first cell, location information indicating that the first terminal device reselects or is handed over from the second cell in the second RAT to the first cell in the first RAT, or the duration in which the first terminal device reselects or is handed over from the second cell in the second RAT to the first cell in the first RAT.

In this embodiment of this disclosure, the downlink path loss compensation value may be calculated by using the following formula (1):

$$\text{downlink path loss compensation value} = (N-x)^* \text{compensation value added for each retransmission} \quad (1)$$

N represents a quantity of actual attempts made by the terminal device when the terminal device successfully accesses the network, and x represents a quantity of attempts expected by the terminal device.

In an embodiment, the plurality of terminal devices may choose to report the calculated downlink path loss compensation values to the NWDAF. In another embodiment, the plurality of terminal devices may choose not to report the calculated downlink path loss compensation values to the NWDAF, but report the parameter used to calculate the downlink path loss compensation value, for example, N, x, and the compensation value added for each retransmission in the foregoing formula (1).

In addition, in this embodiment of this disclosure, a location at which the first terminal device reselects or is handed over from the second cell in the second RAT to the first cell in the first RAT may be determined based on a power (for example, the RSRP) of the first terminal device in the second cell in the second RAT and a power of the first terminal device in the first cell in the first RAT, may be determined based on Global Positioning System (GPS) information of the first terminal device, or may be determined based on a base station connected to the first terminal device. This is not limited.

If the location is determined based on the GPS information, the first terminal device performs GPS positioning before reporting the first information to the NWDAF, and sends the GPS information to the NWDAF.

If the location is determined based on the base station, the base station may include at least three antennas, and positioning is performed based on a triangulation location principle. In this case, similar to a principle in which the first terminal device performs positioning by using three base stations, the first terminal device measures signal strengths of three electric wires, and reports the signal strengths of the three electric wires to the base station, so that the base station can determine a location of the first terminal device based on the signal strength, and send the location to the first terminal device.

According to the solution provided in this disclosure, the information reported by the first terminal device includes at least one piece of the foregoing information, so that the quantity of attempts made by the second terminal device to access the target cell can be further reduced, to reduce the access power consumption and the access duration of the second terminal device. In addition, the duration of network reselection or handover by the second terminal device in the target cell can be reduced.

In the step 240, the first network element may determine the configuration information based on the first information. The configuration information includes configuration information for initially accessing the first cell. Alternatively, the first cell is a cell in the first RAT, the configuration information includes configuration information for reselecting or being handed over from the second cell in the second RAT to the first cell, and a generation of communication in the second RAT is lower than a generation of communication in the first RAT. For implementations of two possible cases, refer to the following descriptions.

Case 1: The Configuration Information Includes the Configuration Information for Initially Accessing the First Cell
Manner 1:

If the configuration information includes the target transmit power, that the first network element determines configuration information based on the first information includes:

The first network element determines the target transmit power based on the actual transmit power at which the first terminal device successfully accesses the first cell.

In this embodiment of this disclosure, that five terminal devices (namely, a terminal device 1, a terminal device 2, a terminal device 3, a terminal device 4, and a terminal device 5) access the first cell is used as an example. It is assumed that the first network element receives first information (which includes at least actual transmit powers at which the five terminal devices access the first cell) reported by the five terminal devices, the first network element may train and learn the first information, and obtain the target transmit power (the target transmit power may be a specific value or a power range) through learning, so that another terminal device accesses the cell.

For example, it is assumed that the transmit powers that are respectively reported by the five terminal devices and that are received by the first network element are −14 dBm, −10 dBm, −15 dBm, −14 dBm, and −19 dBm, the first network element may calculate an average value of the transmit powers and use the average value as the target transmit power, or may determine a power range based on the five transmit powers. The target transmit power may be any value in the power range.

It should be noted that the average value in this embodiment of this disclosure may be an arithmetic average value, a weighted average value, a root mean square average value, or the like. This is not limited. The arithmetic average value is used as an example. The target transmit power obtained by the first network element through learning is [(−14)+(−10)+(−15)+(−14)+(−19)]/5=−14.4 dBm.

The power range may be determined based on a received minimum power value and a received maximum power value, or may be determined based on the average value obtained through calculation.

The received minimum power value and the received maximum power value are used as an example. A power range obtained through learning may be (−22, −14). In this case, the target transmit power may be any value in the range (−22, −14).

The average value obtained through calculation is used as an example. As described above, the average value obtained through calculation based on the arithmetic average value is −14.4. In this case, a threshold may be added to or subtracted from the average value, to obtain the power range. It is assumed that the threshold is 2, the power range is (−16.4, −12.4), and the target transmit power may be any value in the range (−16.4, −12.4).

According to the solution provided in this disclosure, the first network element may determine the target transmit power based on the actual transmit power reported by the first terminal device, so that the second terminal device can access the target cell based on the target transmit power. This can reduce the quantity of attempts made by the second terminal device to access the target cell, to reduce the access power consumption and the access duration of the second terminal device.

Manner 2:

If the configuration information includes the target transmit power, the method further includes:

The first network element sends a request message to a second network element. The request message is used to request the second network element to send an actual receive power of a base station corresponding to the first cell when the first terminal device successfully accesses the first cell.

The first network element receives the actual receive power at which the first terminal device accesses the base station corresponding to the first cell.

That the first network element determines configuration information based on the first information includes:

The first network element determines the target transmit power based on a difference between the actual receive power and the actual transmit power at which the first terminal device accesses the first cell.

The second network element in this embodiment of this disclosure may be the OAM, or may be a combination of the OAM and minimization of drive-tests (MDT). This is not limited.

In this embodiment of this disclosure, the first network element may further inquire, by using the OAM, of the MDT module about the actual receive power at which the first terminal device successfully accesses the base station corresponding to the first cell, and learn the target transmit power based on a difference between the actual receive power and the actual transmit power.

That five terminal devices (namely, a terminal device 1, a terminal device 2, a terminal device 3, a terminal device 4, and a terminal device 5) access the first cell is still used as an example. It is assumed that when the first network element inquires of the MDT module that the five terminal devices successfully access the first cell, the actual receive powers of the base station corresponding to the first cell are respectively −104 dBm, −105 dBm, −105 dBm, −102 dBm, and −110 dBm, and the actual transmit powers reported by the five terminal devices are respectively −14 dBm, −10 dBm, −15 dBm, −14 dBm, and −19 dBm. In this case, differences between actual receive powers and actual transmit powers of the five different terminal devices are −90 dBm, −95 dBm, −90 dBm, −88 dBm, and −91 dBm. The first network element may calculate an average value of the differences and use the average value as an actual path loss for the five terminal devices to access the first cell, or may determine a power range based on the five transmit powers. The actual path loss may be any value in the power range.

The arithmetic average value as an example. An actual path loss obtained through learning is [(−90)+(−95)+(−90)+(−88)+(−91)]/5=−90.8 dBm. If the first network element determines that the actual access power for accessing the first cell is greater than −100 dBm, a target transmit power obtained through learning is −9.2 dBm.

The received minimum power value and the received maximum power value are used as an example. A power range obtained through learning may be (−88, −95). In this case, the actual path loss may be any value in the range (−88, −95). If the first network element determines that the actual access power for accessing the cell is greater than −100 dBm, a range of the target transmit power obtained through learning is (−12, −5). In this case, the second terminal device may access the cell based on a target transmit power of −10 dBm.

According to the solution provided in this disclosure, the first network element may determine the target transmit power based on the actual transmit power of the first terminal device and the actual receive power of the corresponding base station when the first terminal device successfully accesses the first cell, so that the second terminal device can access the target cell based on the target transmit power. This can reduce the quantity of attempts made by the second terminal device to access the target cell, to reduce the access power consumption and the access duration of the second terminal device.

Manner 3:

If the configuration information includes the target path loss compensation value, that the first network element determines configuration information based on the first information includes:

The first network element determines the target path loss compensation value based on the downlink path loss compensation value at which the first terminal device accesses the first cell or the parameter for calculating the downlink path loss compensation value.

That five terminal devices (namely, a terminal device 1, a terminal device 2, a terminal device 3, a terminal device 4, and a terminal device 5) access the first cell is still used as an example. It is assumed that the first network element receives first information (which includes at least downlink path loss compensation values of the five terminal devices) reported by the five terminal devices, and the downlink path loss compensation values reported by the five terminal devices are respectively −10 dBm, −8 dBm, −13 dBm, −12 dBm, and −7 dBm, the first network element may learn the downlink path loss compensation values, and obtain the target path loss compensation value (the target path loss compensation value may be a specific value, or may be a range) through learning, to facilitate access of another terminal device.

Similarly, the average value in this embodiment of this disclosure may be an arithmetic average value, a weighted average value, a root mean square average value, or the like. This is not limited. The arithmetic average value is used as an example. The target path loss compensation value obtained by the first network element through learning is $[(-10)+(-8)+(-13)+(-12)+(-7)]/5=-10$ dBm.

A path loss compensation value range may be determined based on the received minimum path loss compensation value and the received maximum path loss compensation value, or may be determined based on the average value obtained through calculation.

The received minimum path loss compensation value and the received maximum path loss compensation value are used as an example. The path loss compensation value range obtained through learning may be (−13, −7). In this case, the target path loss compensation value may be any value in the range (−13, −7).

The average value obtained through calculation is used as an example. As described above, the average value obtained through calculation based on the arithmetic average value is −10 dBm. In this case, a threshold may be added to or subtracted from the average value, to obtain the target path loss compensation value range. It is assumed that the threshold is 2, the target path loss compensation value range is (−12, −8), and the target path loss compensation value may be any value in the range (−12, −8).

According to the solution provided in this disclosure, the first network element may determine the target path loss compensation value based on the downlink path loss compensation value, so that the second terminal device can access the target cell based on the target path loss compensation value. This can reduce the quantity of attempts made by the second terminal device to access the target cell, to reduce the access power consumption and the access duration of the second terminal device.

Optionally, in some embodiments, the configuration information further includes a target area, and the method further includes:

The first network element determines the target area based on an RSRP of the first terminal device in the first cell and an RSRP of the first terminal device in a neighboring cell of the first cell. The target area indicates a problem area in the first cell.

In addition/Alternatively, the first network element determines the target area based on the location information indicating that the first terminal device reselects or is handed over from the second cell in the second RAT to the first cell.

In this embodiment of this disclosure, the first network element may determine the target area based on the RSRP of the first terminal device in the first cell and the RSRP of the first terminal device in the neighboring cell of the first cell, and/or determine the target area based on the location information indicating that the first terminal device reselects or is handed over from the second cell in the second RAT (for example, a 2G cell) to the first cell (for example, a 5G cell).

1. Determine the Target Area Based on the RSRP

Figure 3:
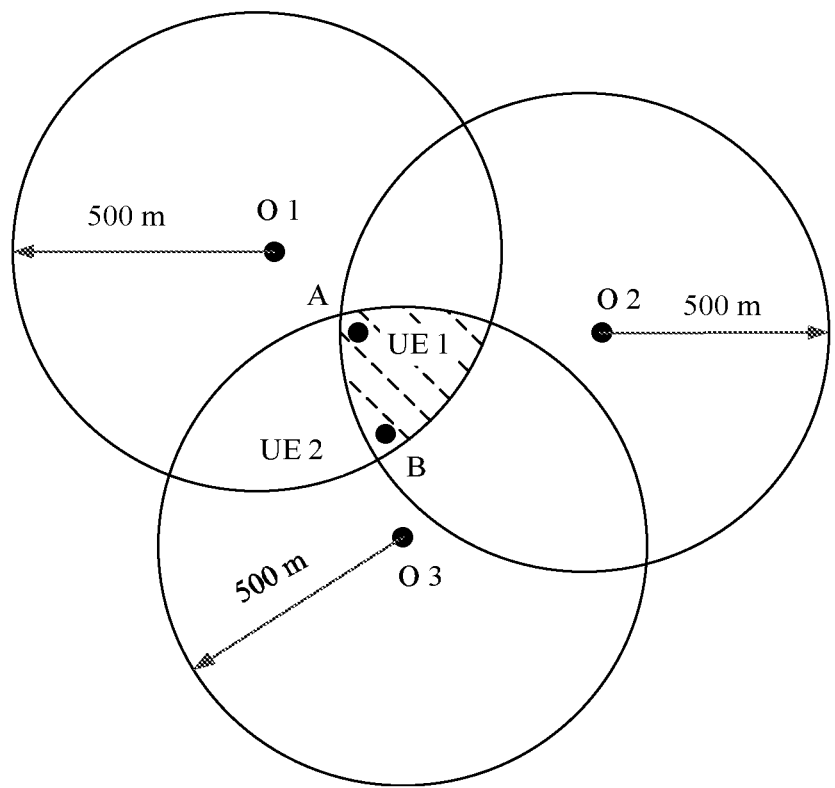
FIG. 3 is a schematic diagram of a coverage relationship between a base station and a terminal device according to an embodiment of this disclosure.

FIG. 3 is a schematic diagram of a coverage relationship between a base station and a terminal device according to an embodiment of this disclosure.

It is assumed that O 1, O 2, and O 3 respectively represent locations of the base stations, areas respectively covered by the base stations are areas that use O 1, O 2, and O 3 as centers of circles and 500 m as radiuses, which are respectively referred to as a cell 1, a cell 2, and a cell 3. If UE 1 is located at a location shown by a point A in the figure, and randomly accesses the cell 1, while the exception condition is met, the UE 1 may report RSRPs of the UE 1 in the cell 1 and neighboring cells (namely, the cell 2 and the cell 3) of the cell 1 to the first network element. In this case, the first network element may learn the RSRP and determine a problem area in the cell 1.

For example, the first network element may consider that the UE 1 is located in an overlapping range of the three cells, that is, an area formed by dashed lines shown in the figure. In this case, the first network element may consider that the area is a part of the problem area in the cell 1.

Similarly, for another UE, a same method may also be used to determine a problem range in a cell that serves the another UE. If UE 2 is located at a location shown by a point B in the figure, and randomly accesses the cell 2, while the exception condition is met, the UE 2 may report RSRPs of the UE 2 in the cell 2 and neighboring cells (namely, the cell 1 and the cell 3) of the cell 2 to the first network element. In this case, the first network element may learn the RSRP and determine a problem area in the cell 2.

For example, the first network element considers that the UE 2 is also located in the overlapping range of the three cells, that is, the area formed by the dashed lines shown in the figure. In this case, the first network element may consider that the area is a problem area in the cell 1 that serves the UE1 and the cell 2 that serves the UE 2.

Similarly, for the cell 3, the foregoing method may also be used to determine a problem area in the cell 3. Details are not described again.

2. Determine the Target Area Based on the Location Information

Figure 4:
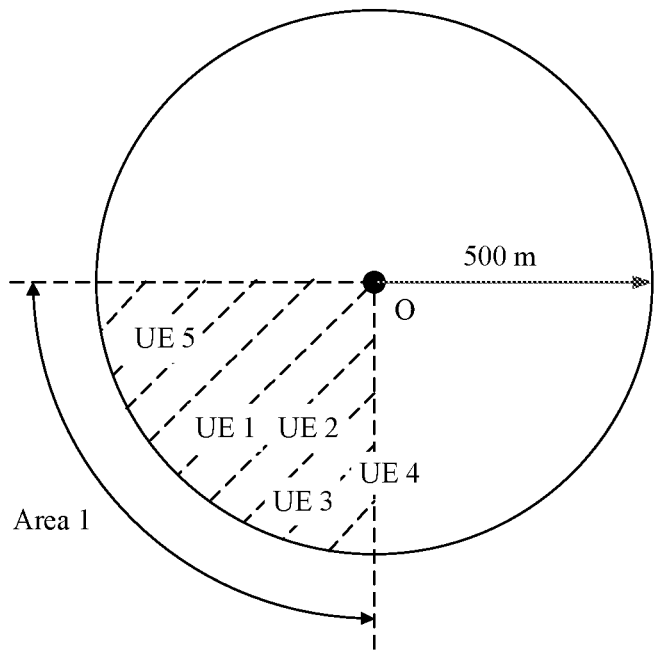
FIG. 4 is a schematic diagram of another coverage relationship between a base station and a terminal device according to an embodiment of this disclosure.

FIG. 4 is a schematic diagram of another coverage relationship between a base station and a terminal device according to an embodiment of this disclosure.

It is assumed that the first network element receives information reported by five UEs (namely, the UE 1, the UE 2, UE 3, UE 4, and UE 5), if the five cells cover a range using O as a center of a circle and 500 m as a radius, and the five UEs are located at locations shown in FIG. 4, and report the location information to the first network element, the first network element may learn the location information and determine a problem range in the cell.

For example, the first network element may consider that the five UEs are all located in an area 1 in the figure, that is, located in an area formed by dashed lines in FIG. 4. In this case, the first network element may consider that the area 1 is a problem range in the first cell.

According to the solution provided in this disclosure, the first network element may determine the target area based on the first information reported by the first terminal device, so that when the second terminal device is located in the target area, the second terminal device may access the target cell based on target information. This can reduce the quantity of attempts made by the second terminal device to access the target cell, to reduce the access power consumption and the access duration of the second terminal device.

Optionally, in some embodiments, the method further includes:

The first network element performs exception report configuration on the first terminal device. The exception report configuration indicates the first terminal device to report the first information to the first network element when the exception condition is met.

In this embodiment of this disclosure, the first network element may perform the exception report configuration on the first terminal device. To be specific, the first terminal device may report the first information to the first network element when the exception condition is met.

It should be noted that, if a quantity of random access attempts made by the first terminal device to successfully access a cell is greater than or equal to the first threshold, the first terminal device may report parameter information of an exception in the cell. If the first terminal device continuously accesses the cell for N times (N is greater than or equal to the first threshold) and fails to access the cell, and may successfully access another cell, the first terminal device may also report the parameter information of the exception in the cell.

Optionally, in some embodiments, the method further includes: The first network element receives a message that a third network element subscribes to the exception report configuration from the first network element.

In this embodiment of this disclosure, the first network element may further receive the message that the third network element subscribes to the exception report configuration from the first network element. Therefore, after determining the configuration information based on the received first information reported by the first terminal device, the first network element may send the configuration information to the third network element, so that the second terminal device accesses the target cell.

Figure 5A:
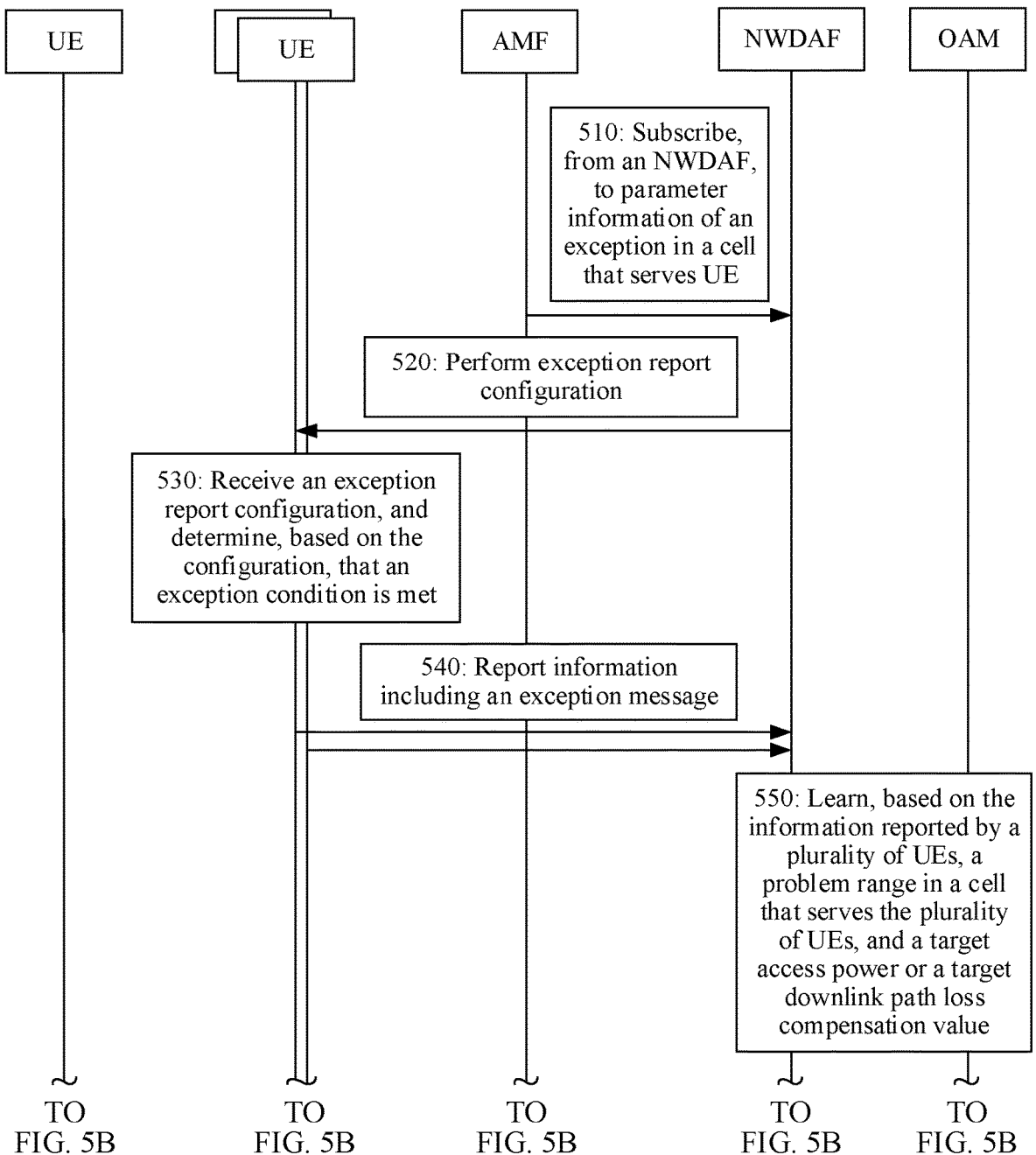
FIG. 5A and FIG. 5B are a schematic flowchart of another communication method according to an embodiment of this disclosure.
Figure 5B:
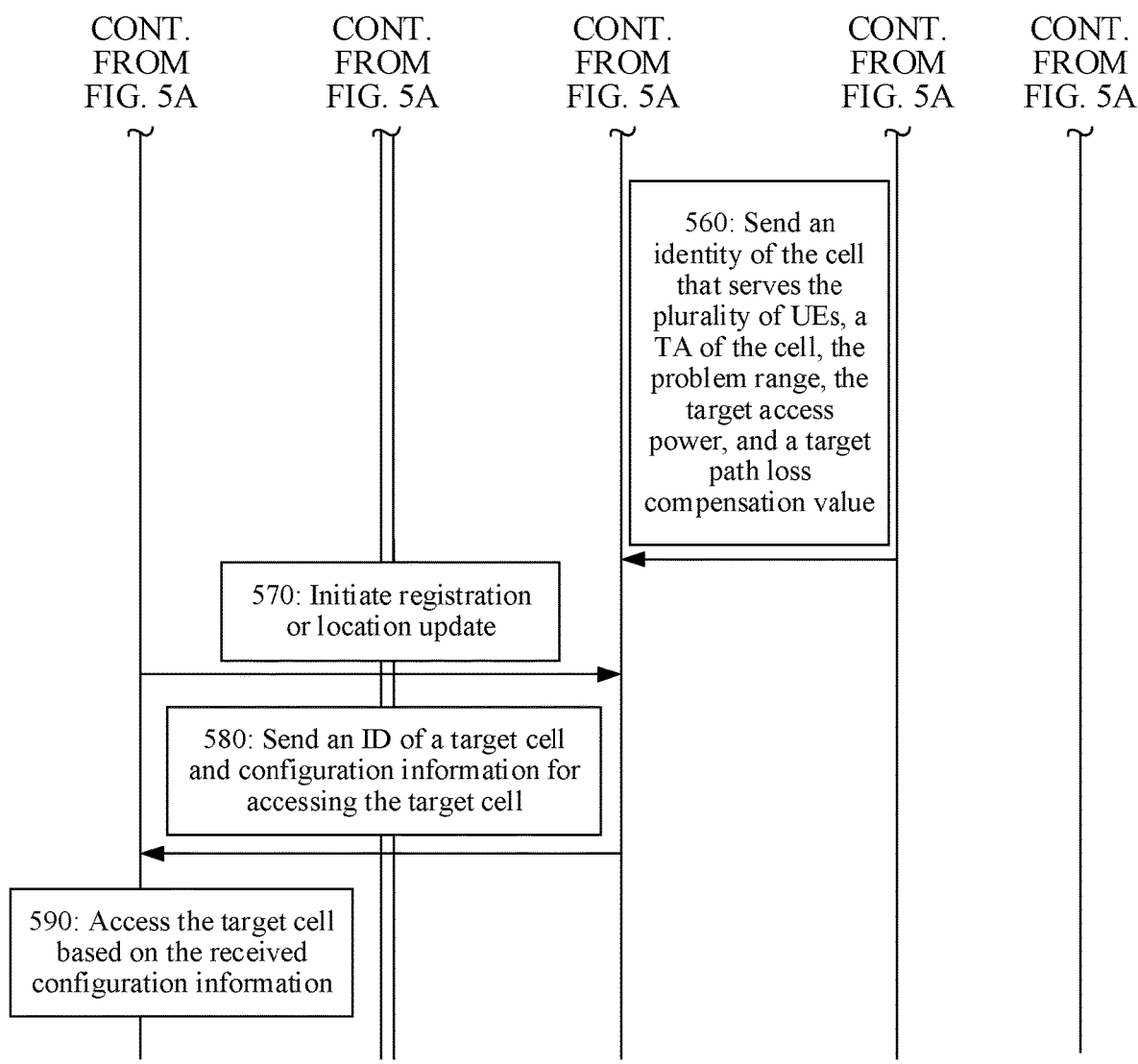

The following describes the solutions in an embodiment of this disclosure in detail with reference to FIG. 5A and FIG. 5B by using an example in which the first terminal device includes a plurality of UEs. FIG. 5A and FIG. 5B are a schematic diagram of another communication method 500. The method 500 may include steps 510 to 590.

510: An AMF subscribes, from an NWDAF, to parameter information of an exception in a cell that serves UE.

As described above, the NWDAF may analyze and identify a status of the UE. In a subsequent step, because the UE may initiate registration or location update to the AMF, the AMF may subscribe, from the NWDAF, to the parameter information of the exception in the cell (namely, the foregoing first cell) that serves the UE. To be specific, when finding that the cell that serves the UE meets the exception condition, the UE may report the parameter information of the exception in the cell to the NWDAF. Therefore, the NWDAF may send the parameter information of the exception in the cell to the AMF that subscribes to the exception information.

520: The NWDAF performs exception report configuration on a plurality of UEs.

For example, the NWDAF may perform the exception report configuration on the plurality of UEs by using a policy control function (PCF), or may perform the exception report configuration on the plurality of UEs by using a user plane. This is not specifically limited in this disclosure.

If the NWDAF performs the exception report configuration on the plurality of UEs by using the PCF, the NWDAF may send configuration information to the PCF, the PCF sends the configuration information to the AMF, and the AMF sends the configuration information to the UE, to indicate the UE to perform reporting when finding that a cell serving the UE meets the exception condition.

If the NWDAF performs the exception report configuration by using the user plane, the NWDAF may send configuration information to the user plane, and the user plane sends the configuration information to the UE, to indicate the UE to perform reporting when finding that a cell serving the UE meets the exception condition.

530: The plurality of UEs receive the exception report configuration, and determine, based on the received configuration, that the exception condition is met.

The exception condition may include at least one of the following: Quantities of random access attempts made by the plurality of UEs to access a cell that provides a service are greater than or equal to a first threshold. Actual transmit powers at which the plurality of UEs access the cell that provides a service are greater than or equal to a second threshold. Duration in which the plurality of UEs reselect or are handed over from a second cell in a second RAT to a first-RAT cell that provides a service is greater than or equal to a third threshold. A generation of communication in the second RAT is lower than a generation of communication in the first RAT.

For specific content of the exception condition, refer to related content of the method 200. Details are not described herein again.

540: The plurality of UEs report information including an exception message to the NWDAF.

The information may include an ID of a cell that provides a service, a TA of the cell that provides a service, RSRPs of the plurality of UEs in the cell that provides a service, IDs of a plurality of neighboring cells of the cell that provides a service, RSRPs of the plurality of UEs in the plurality of neighboring cells, downlink path loss compensation values at which the plurality of UEs access the cell that provides a service, parameters for calculating the downlink path loss compensation values, the actual transmit powers at which the plurality of UEs access the cell that provides a service, location information indicating that the plurality of UEs access the cell that provides a service, location information indicating that the plurality of UEs reselect or are handed over from the second cell in the second RAT to the first-RAT cell that provides a service, and the duration in which the plurality of UEs reselect or are handed over from the second cell in the second RAT to the first-RAT cell that provides a service.

550: The NWDAF learns, based on the information reported by the plurality of UEs, a problem range in a cell that serves the plurality of UEs, and a target access power or a target path loss compensation value.

For learning the problem range in the cell that serves the plurality of UEs, and the target access power or the target path loss compensation value, refer to the content in Case 1. Details are not described again.

560: The NWDAF sends, to the AMF, the identity of the cell that serves the plurality of UEs, the TA of the cell, the problem range, the target access power, and the target path loss compensation value.

570: A to-be-connected device initiates registration or location update to the AMF.

In this embodiment of this disclosure, the to-be-connected device is the foregoing second terminal device. The to-be-connected device may be UE in the plurality of UEs mentioned above, or may be UE other than the plurality of UEs. This is not limited.

580: The AMF sends, to the to-be-connected device, an ID of a target cell and configuration information for accessing the target cell.

In this embodiment of this disclosure, the configuration information of the target cell may include the problem range in the target cell and the target access power or the target path loss compensation value that are learned in the step 550. It may be understood that if the to-be-connected device is ready to access a cell in the foregoing cells that provide a service, the cell is the target cell.

590: When randomly accessing the target cell, the to-be-connected device accesses the target cell based on the received configuration information.

In this embodiment of this disclosure, when randomly accessing the determined problem range of the target cell, the to-be-connected device may access the target cell based on the received target access power or the received target path loss compensation value.

1. Use the Target Access Power as an Example

It is assumed that the target access power determined in the foregoing steps is a specific value, the to-be-connected device may directly use the target access power as the actual transmit power, and access the target cell.

For example, if the target transmit power determined in the foregoing steps is −10 dBm, the to-be-connected device may perform random access based on the target transmit power −10 dBm. In this case, when the to-be-connected device accesses the target cell, access may succeed at a time, or may not succeed at a time. If the to-be-connected device does not successfully access the target cell at a time, the to-be-connected device may continue to add a power to the target transmit power, to successfully access the target cell.

For example, the to-be-connected device may randomly access the target cell based on the transmit power −8 dBm.

It is assumed that the target access power determined in the foregoing steps is a power range, the to-be-connected device may perform access based on any value in the power range.

For example, if the power range determined in the foregoing steps is (−16.4, −12.4), the to-be-connected device may perform random access based on any value in the range, for example, may perform random access based on −14 dBm. In this case, when the to-be-connected device accesses the target cell, access may succeed at a time, or may not succeed at a time. If the to-be-connected device does not successfully access the target cell at a time, the to-be-connected device may continue to add a power to the selected power, to successfully access the target cell. For example, the to-be-connected device may randomly access the target cell based on the transmit power −13 dBm.

2. Use the Target Path Loss Compensation Value as an Example

It is assumed that the target path loss compensation value determined in the foregoing steps is a specific value, the to-be-connected device may determine a transmit power based on the target path loss compensation value, and perform random access based on the determined transmit power.

For example, if the target path loss compensation value determined in the foregoing steps is 10 dBm, the to-be-connected device may determine the transmit power based on the target path loss compensation value of 10 dBm. If the path loss, calculated by the to-be-connected device, for accessing the target cell is 80 dBm, and the actual access power for accessing the base station of the target cell is −110 dBm, the to-be-connected device may perform random access based on −20 dBm. When the to-be-connected device accesses the target cell, access may succeed at a time, or may not succeed at a time. If the to-be-connected device does not successfully access the target cell at a time, the to-be-connected device may continue to add a power to the determined transmit power, to successfully access the target cell. For example, the to-be-connected device may randomly access the target cell based on the transmit power −16 dBm.

It is assumed that the target path loss compensation value determined in the foregoing steps is a power range, the to-be-connected device may determine a transmit power range based on the power range, and perform random access based on a value in the determined transmit power range.

For example, if the power range determined in the foregoing steps is (−12, −8), the to-be-connected device may determine the power range based on the range. If the path loss, calculated by the to-be-connected device, for accessing the target cell is 80 dBm, and the actual access power for accessing the target cell is −110 dBm, the determined transmit power range is (−22, −18). It is assumed that random access is performed based on −20 dBm, when the to-be-connected device accesses the target cell, access may succeed at a time, or may not succeed at a time. If the to-be-connected device does not successfully access the target cell at a time, the to-be-connected device may continue to add a power to the selected power, to successfully access the target cell. For example, the to-be-connected device may randomly access the target cell based on the transmit power −16 dBm.

Case 2: The Configuration Information Includes Configuration Information for Reselecting or Being Handed Over From the Second Cell in the Second RAT to the First Cell in the First RAT Manner 1:

If the configuration information includes the target start occasion, that the first network element determines configuration information based on the first information includes:

The first network element determines, based on the first information, a first power range of the first terminal device in the first cell in the first RAT and a second power range of the first terminal device in the second cell in the second RAT.

When a second terminal device accesses the first cell, an RSRP in the first cell falls within the first power range, and an RSRP in the second cell in the second RAT falls within the second power range, the first network element determines that a current occasion is the target start occasion. The target start occasion is an occasion on which the second terminal device starts first-RAT network search.

The occasion for starting first-RAT network search in this embodiment of this disclosure may be understood as an occasion on which the second terminal device is ready to search for a 4G or 5G network (or may also be referred to as an occasion for searching for a high-RAT network).

That five terminal devices (namely, a terminal device 1, a terminal device 2, a terminal device 3, a terminal device 4, and a terminal device 5) access a cell is still used as an example. It is assumed that the first network element receives first information reported by the five terminal devices, the first network element may learn the first information, and obtain a condition of the target start occasion (the condition of the target start occasion may be a power range) through learning.

For example, conditions of the target start occasions respectively reported by the five terminal devices are as follows. A power range of the terminal device 1 in the second cell in the second RAT is (−100, −80), and a power range of the terminal device 1 in the first cell in the first RAT is (−50, −30). A power range of the terminal device 2 in the second cell in the second RAT is (−90, −80), and a power range of the terminal device 2 in the first cell in the first RAT is (−40, −30). A power range of the terminal device 3 in the second cell in the second RAT is (−90, −70), and a power range of the terminal device 3 in the first cell in the first RAT is (−30, −20). A power range of the terminal device 4 in the second cell in the second RAT is (−90, −80), and a power range of the terminal device 4 in the first cell in the first RAT is (−40, −30). A power range of the terminal device 5 in the second cell in the second RAT is (−80, −70), and a power range of the terminal device 5 in the first cell in the first RAT is (−30, −10). In this case, the first network element may separately calculate an average value of the power ranges in the second cell in the second RAT and an average value of the power ranges in the first cell in the first RAT, and use the obtained average value of the power ranges as a conditional power of the target start occasion.

The average value in this embodiment of this disclosure may be an arithmetic average value, a weighted average value, a root mean square average value, or the like. This is not limited. The arithmetic average value is used as an example. The power range, obtained through learning, in the second cell in the second RAT is (−90, −76), and the power range, obtained through learning, in the first cell in the first RAT is (−39, −24).

When the second terminal device is ready to reselect or be handed over to the target cell (the target cell is at least one of the first cell) in the first RAT, an RSRP in the target cell in the first RAT is in (−39, −24), and an RSRP in the target cell in the second RAT is in (−90, −76), for example, when the RSRP of the second terminal device in the target cell in the first RAT is −30 dBm, and the RSRP of the second terminal in the second cell in the second RAT is −80 dBm, the first network element determines that a current occasion is the target start occasion, and may indicate the second terminal device to start high-RAT network search.

According to the solution provided in this disclosure, the first network element may determine the target start occasion based on the power range of the second cell in the second RAT and the power range of the first cell in the first RAT that are reported by the first terminal device, so that the second terminal device can start high-RAT network search when the power range of the second cell in the second RAT and the power range of the target cell in a first RAT are met, to reselect or be handed over to the target cell in the first RAT. This can reduce the duration of network reselection or handover by the second terminal device in the target cell.

Manner 2:

If the configuration information includes the target network search period, that the first network element determines configuration information based on the first information includes:

The first network element determines the target network search period based on the duration in which the first terminal device reselects or is handed over from the second cell in the second RAT to the first cell.

In this embodiment of this disclosure, it is assumed that the first network element receives first information (which includes at least duration in which five terminal devices reselect or are handed over from the second cell in the second RAT to the first cell in the first RAT) reported by the five terminal devices (namely, a terminal device 1, a terminal device 2, a terminal device 3, a terminal device 4, and a terminal device 5), the first network element may learn the first information, and obtain the target network search period (the target network search period may be a specific value, or may be a range) through learning, to facilitate network search of the second terminal device.

For example, it is assumed that restoration durations (namely, the foregoing duration in which the first terminal device reselects or is handed over from the second cell in the second RAT to the first cell in the first RAT) respectively reported by the five terminal devices are 8 ms, 6 ms, 7 ms, 5 ms, and 6 ms, the first network element may calculate an average value of the restoration durations and use the average value as the target network search period, or may determine a network search period range based on the five restoration durations. The target network search period may be any value in the network search period range.

It should be noted that the average value in this embodiment of this disclosure may be an arithmetic average value, a weighted average value, a root mean square average value, or the like. This is not limited. The arithmetic average value is used as an example. The target network search period obtained through learning is (8+6+7+5+6)/5=6 ms.

The network search period range may be determined based on a received smallest restoration duration value and a received largest restoration duration value, or may be determined based on the average value obtained through calculation.

The received smallest restoration duration value and the received largest restoration duration value are used as an example. The network search period range obtained through learning may be (5, 8). In this case, the target network search period may be any value in the range (5, 8).

The average value obtained through calculation is used as an example. As described above, the average value obtained through calculation based on the arithmetic average value is 6. In this case, a threshold may be added to or subtracted from the average value, to obtain the network search period range. It is assumed that the threshold is 2, the network search period range is (4, 8), and the target network search period may be any value in the network search period range (4, 8). When reselecting or being handed over from the second cell in the second RAT to the target cell in the first RAT, the second terminal device may perform network search based on the target network search period, to reduce duration for restoring a network in the target cell.

According to the solution provided in this disclosure, the first network element may determine the target network search period based on the duration reported by the first terminal device, so that the second terminal device can reselect or be handed over to the target cell in the first RAT based on the target network search period. This can reduce the duration of network reselection or handover by the second terminal device in the target cell.

Optionally, in some embodiments, the configuration information further includes a target area, and the method further includes:

The first network element determines the target area based on an RSRP of the first terminal device in the first cell and an RSRP of the first terminal device in a neighboring cell of the first cell. The target area indicates a problem area in the first cell.

Alternatively, the first network element determines the target area based on the location information indicating that the first terminal device reselects or is handed over from the second cell in the second RAT to the first cell.

For content of determining the target area, refer to the content in Case 1. Details are not described again.

Optionally, in some embodiments, the method further includes:

The first network element sends an ID of the second cell and the ID of the first cell to the second network element.

Second information sent by the second network element is received. The second information includes information that is about whether the second cell and the first cell are neighboring cells and that is determined by the second network element.

That the first network element determines configuration information based on the first information includes:

If the second information includes the information that the second cell and the first cell are neighboring cells, the first network element determines the configuration information based on the first information.

In this embodiment of this disclosure, after the first terminal device sends the ID of the second cell in the second RAT and the ID of the first cell to the second network element (for example, the OAM), the second network element may determine whether the second cell is neighboring to the first cell. If the second cell is neighboring to the first cell, the second network element sends information about the second cell and the first cell to the first network element. The first network element determines the configuration information based on the received first information.

In addition, if determining that the second cell is not neighboring to the first cell, the second network element may perform neighboring cell configuration on the second cell and the first cell based on a database of the second network element, that is, separately search the database for a neighboring cell of the second cell in the second RAT and a neighboring cell of the first cell in the first RAT and configure the found neighboring cells for corresponding cells respectively; obtain parameter information indicating that the plurality of UEs reselect or are handed over from the second cell in the second RAT to the configured neighboring first cell in the first RAT; and send the parameter information to the first network element.

According to the solution provided in this disclosure, the second network element determines whether the second cell in the second RAT is neighboring to the first cell in the first RAT. When determining that the second cell in the second RAT is neighboring to the first cell in the first RAT, the first network element determines the configuration information based on the first information. This can further reduce the duration of network reselection or handover by the second terminal device in the target cell.

Optionally, in some embodiments, the method further includes:

The first network element performs exception report configuration on the first terminal device. The exception report configuration indicates the first terminal device to report the first information to the first network element when the exception condition is met.

Optionally, in some embodiments, the method further includes:

The first network element receives a message that a third network element subscribes to the exception report configuration from the first network element.

For content of determining the exception report configuration, refer to the content in Case 1. Details are not described again.

Figure 6A:
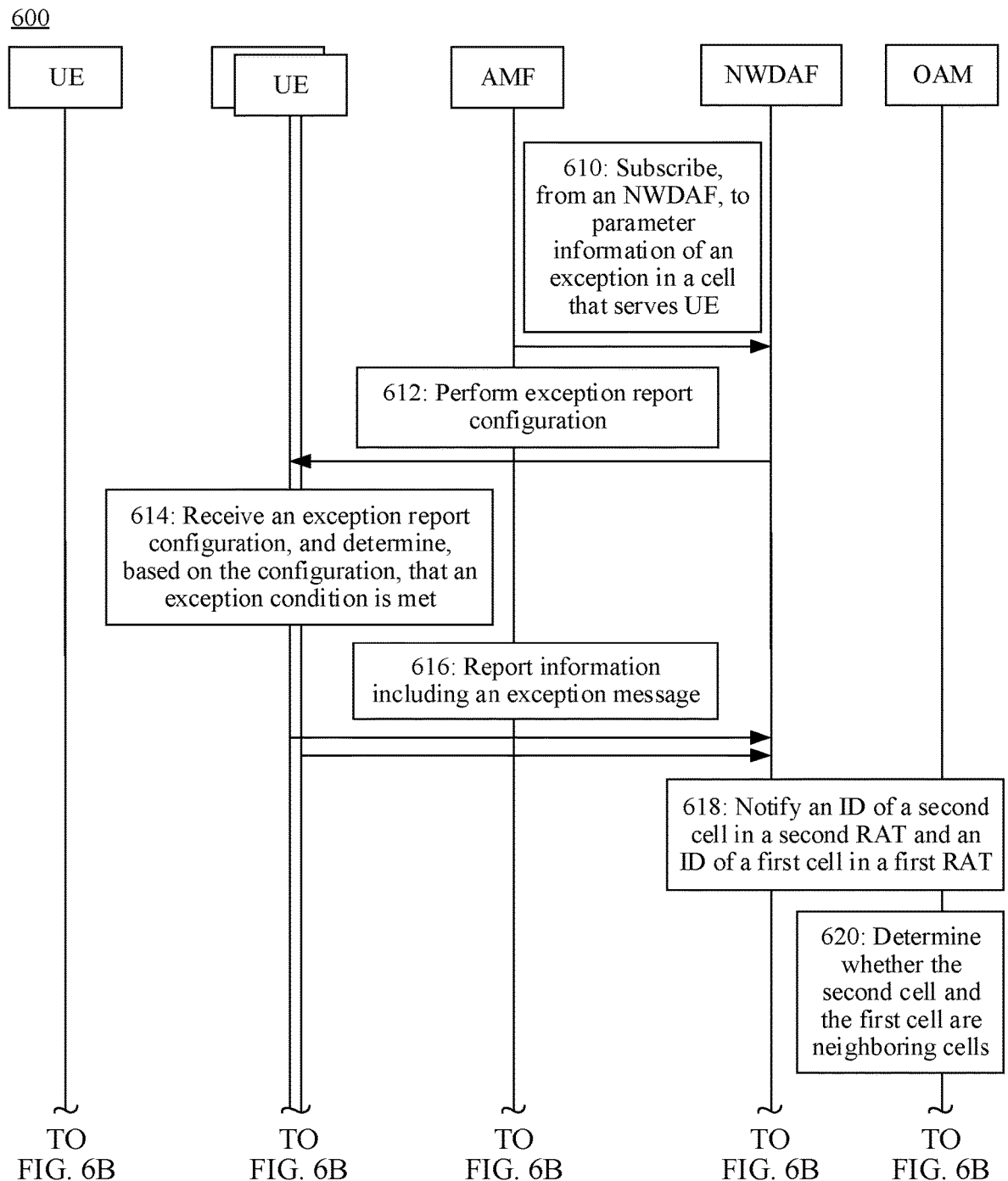
FIG. 6A and FIG. 6B are a schematic flowchart of still another communication method according to an embodiment of this disclosure.
Figure 6B:
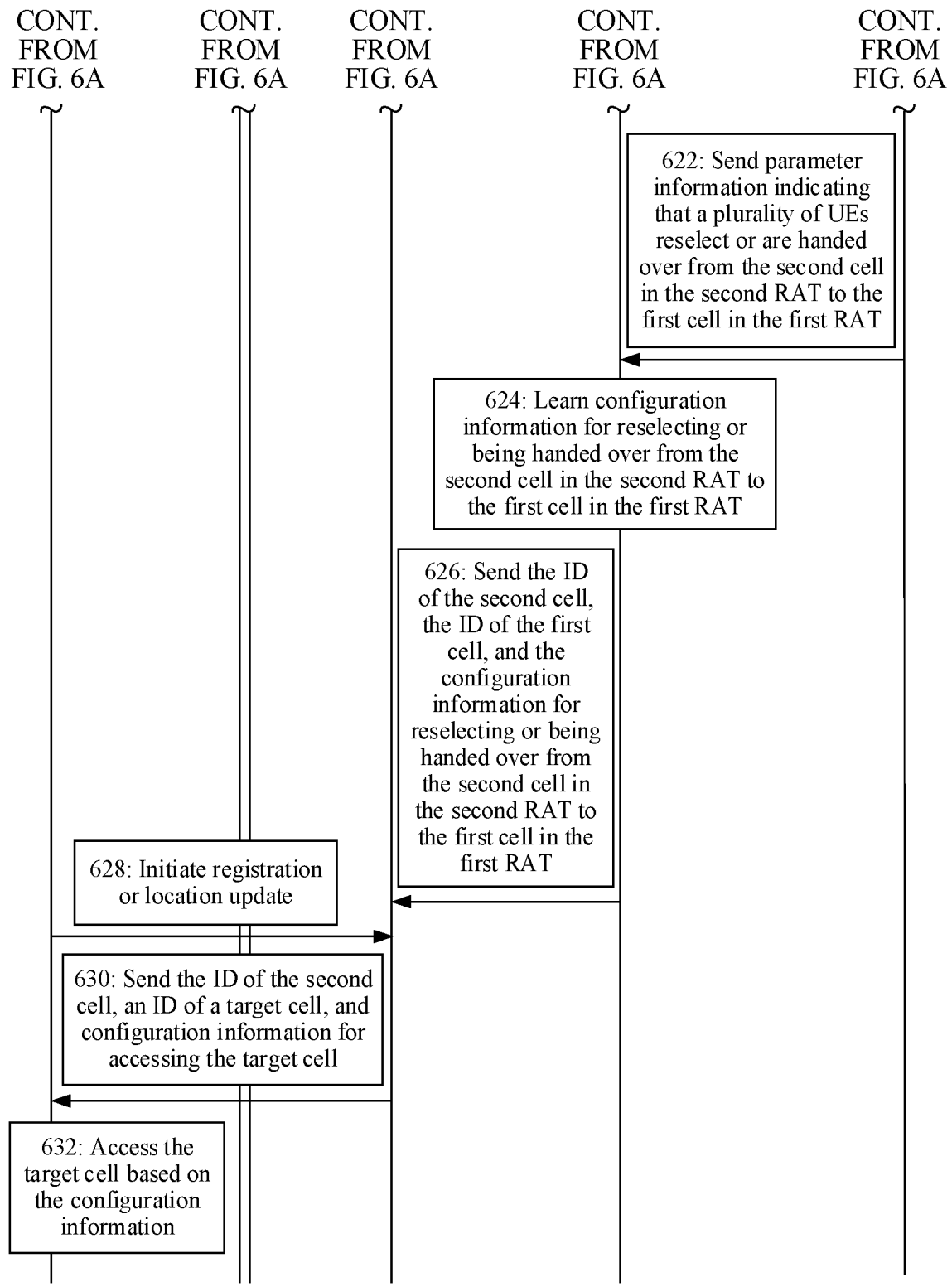

The following describes the solutions in an embodiment of this disclosure in detail with reference to FIG. 6A and FIG. 6B. FIG. 6A and FIG. 6B are a schematic diagram of still another communication method 600. The method 600 may include steps 610 to 632.

610: An AMF subscribes to a UE exception from an NWDAF.

612: The NWDAF performs exception report configuration on a plurality of UEs.

614: The plurality of UEs receive the exception report configuration, and determine, based on the received configuration, that an exception condition is met.

For descriptions of the steps 610 to 614, refer to related content of the steps 510 to 530 in FIG. 5A. Details are not described again.

616: The plurality of UEs report information including an exception message to the NWDAF.

The information may include an ID (which includes an ID of a second cell in a second RAT and an ID of a first cell in a first RAT described below) of a cell that provides a service, a TA of the cell that provides a service, RSRPs of the plurality of UEs in the cell that provides a service, IDs of a plurality of neighboring cells of the cell that provides a service, RSRPs of the plurality of UEs in the plurality of neighboring cells, downlink path loss compensation values at which the plurality of UEs access the cell that provides a service, parameters for calculating the downlink path loss compensation values, actual transmit powers at which the plurality of UEs access the cell that provides a service, location information indicating that the plurality of UEs access the cell, location information indicating that the plurality of UEs reselect or are handed over from the second cell in the second RAT to the first cell in the first RAT, and the duration in which the plurality of UEs reselect or are handed over from the second cell in the second RAT to the first cell in the first RAT.

618: The NWDAF notifies the OAM of the ID of the second cell in the second RAT and the ID of the first cell in the first RAT.

For example, it is assumed that the NWDAF receives information that is reported by five UEs and that includes an exception message, the NWDAF may send the ID of the second cell in the second RAT and the ID of the first cell in the first RAT of the five UEs to the OAM.

620: The OAM determines whether the second cell and the first cell are neighboring cells.

If the OAM determines that the second cell and the first cell are not neighboring cells, the OAM may perform neighboring cell configuration on the second cell in the second RAT and the first cell in the first RAT based on a database of the OAM, that is, separately search the database for a neighboring cell of the second cell in the second RAT and a neighboring cell of the first cell in the first RAT and configure the found neighboring cells for corresponding cells respectively; and obtain parameter information indicating that the plurality of UEs reselect or are handed over from the second cell in the second RAT to the configured neighboring first cell in the first RAT.

If the OAM determines that the second cell in the second RAT and the first cell in the first RAT are neighboring cells, the OAM may obtain parameter information indicating that the plurality of UEs reselect or are handed over from the second cell in the second RAT to the first cell in the first RAT.

The parameter in this embodiment of this disclosure may include location information indicating that different UEs in the plurality of UEs reselect or are handed over from the second cell in the second RAT to the first cell in the first RAT, a signal status of the second cell in the second RAT and a signal status of the first cell in a first RAT when the different UEs in the plurality of UEs reselect or are handed over from the second cell in the second RAT to the first cell in the first RAT, duration in which the different UEs in the plurality of UEs reselect or are handed over from the second cell in the second RAT to the first cell in the first RAT, and the like.

622: The OAM sends, to the NWDAF, the parameter information indicating that the plurality of UEs reselect or are handed over from the second cell in the second RAT to the first cell in the first RAT.

624: The NWDAF learns, based on the received parameter information, configuration information for reselecting or being handed over from the second cell in the second RAT to the first cell in the first RAT, for example, a problem range, a target start occasion, or a target network search period for reselecting or being handed over from the second cell in the second RAT to the first cell in the first RAT.

For a learning manner, refer to related content in Case 2. Details are not described herein again.

626: The NWDAF sends, to the AMF, the ID of the second cell, the ID of the first cell, and the configuration information for reselecting or being handed over from the second cell in the second RAT to the first cell in the first RAT.

628: A to-be-connected device initiates registration or location update to the AMF.

In this embodiment of this disclosure, the to-be-connected device is the foregoing second terminal device. The to-be-connected device may be UE in the plurality of UEs mentioned above, or may be UE other than the plurality of UEs. This is not limited.

630: The AMF sends, to the to-be-connected device, the ID of the second cell, an ID of a target cell, and configuration information for accessing the target cell.

In this embodiment of this disclosure, the configuration information of the target cell may include the problem range, the target start occasion, or the target network search period that is learned in the step 624 and that is for reselecting or being handed over from the second cell in the second RAT to the first cell in the first RAT. It may be understood that, if the to-be-connected device is ready to access the first cell in the first RAT from the second cell in the second RAT, the first cell is the target cell.

632: Access the target cell based on the configuration information.

In this embodiment of this disclosure, when randomly accessing the determined problem range of the target cell, the to-be-connected device may access the target cell based on the received target start occasion and the received target network search period, that is, reselect or be handed over from a low-RAT cell to a high-RAT cell based on the received target start occasion and the received target network search period.

It should be noted that the problem range of the target cell is similar to that in the foregoing method 500. When the to-be-connected device is located in the problem range of the target cell, the to-be-connected device may access the target cell based on the received configuration information. In one aspect, the to-be-connected device may start high-RAT network search when the to-be-connected device is located in the problem range of the target cell. In another aspect, the to-be-connected device may perform network search based on the target network search period.

1. Start High-RAT Network Search Based on the Target Start Occasion

It is assumed that a condition of the target start occasion determined in the foregoing steps is a power range of the terminal device in the second cell in the second RAT and a power range of the terminal device in the target cell in a first RAT, the to-be-connected device may determine, based on the power ranges, whether to start high-RAT network search.

For example, if the power range of the second cell in the second RAT determined in the foregoing steps is (−90, −72) and the power range of the target cell in the first RAT determined in the foregoing steps is (−39, −24), and the power of the to-be-connected device in the second cell in the second RAT and the power of the to-be-connected device in the target cell in the first RAT respectively fall within two power ranges (for example, the power in the second cell in the second RAT is −80 dBm and the power in the target cell in the first RAT is −30 dBm), the to-be-connected device may start high-RAT network search.

2. Perform Network Search Based on the Target Network Search Period

It is assumed that the target network search period determined in the foregoing steps is a specific value, the to-be-connected device may directly perform network search based on the target network search period.

For example, if the target network search period determined in the foregoing steps is 6 ms, the to-be-connected device may perform network search based on the target network search period 6 ms. When the to-be-connected device performs high-RAT network search, network search may succeed at a time, or may not succeed at a time. If the to-be-connected device does not successfully perform network search at a time, the to-be-connected device may continue to perform high-RAT network search at a period of 6 ms until network search succeeds.

It is assumed that the target network search period determined in the foregoing steps is a period range, the to-be-connected device may periodically perform network search based on any value in the period range.

For example, if the period range determined in the foregoing steps is (4, 8), the to-be-connected device may periodically perform network search based on any value in the range, for example, may periodically perform network search based on 5 ms. In this case, when the to-be-connected device performs high-RAT network search, network search may succeed at a time, or may not succeed at a time. If the to-be-connected device does not successfully perform network search at a time, the to-be-connected device may continue to perform high-RAT network search at a period of 5 ms until network search succeeds, or may perform high-RAT network search at a period of 6 ms until network search succeeds.

Figure 7:
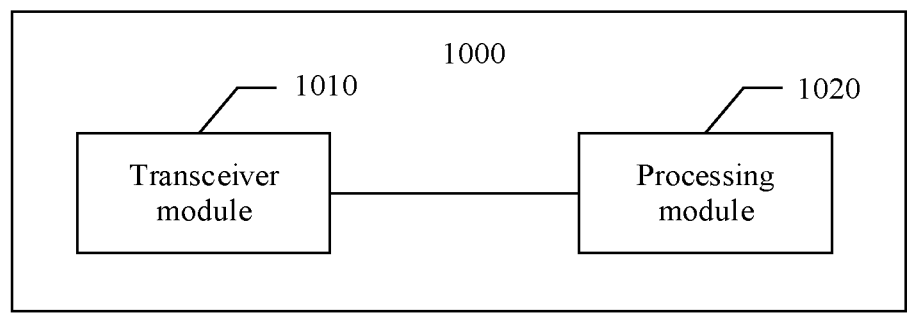
FIG. 7 is a schematic diagram of a structure of a communication apparatus according to an embodiment of this disclosure.
Figure 8:
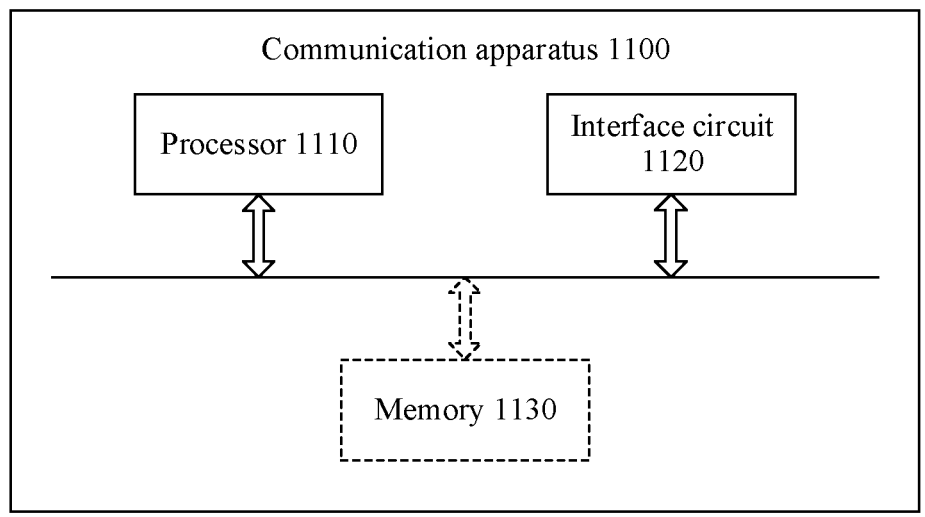
FIG. 8 is a schematic diagram of a structure of another communication apparatus according to an embodiment of this disclosure.

FIG. 7 and FIG. 8 are schematic diagrams of structures of possible communication apparatuses according to embodiments of this disclosure. The communication apparatuses may implement the functions of the terminal device or the network device in the foregoing method embodiments. Therefore, beneficial effects of the foregoing method embodiments can also be implemented. In embodiments of this disclosure, the communication apparatuses may be the terminal device 130 or 140 shown in FIG. 1, may be the access network device 120 shown in FIG. 1, or may be a module (for example, a chip) applied to the terminal device or the access network device.

FIG. 7 is a schematic diagram of a structure of a communication apparatus 1000 according to an embodiment of this disclosure. The apparatus 1000 may include a transceiver module 1010 and a processing module 1020.

When the communication apparatus 1000 is configured to implement a function of the first terminal device in the method embodiment in FIG. 2, the processing module 1020 is configured to determine first information when an exception condition is met. The first information is used to indicate parameter information of an exception when the first terminal device accesses a first cell, and the first cell is a cell that serves the first terminal device. The transceiver module 1010 is configured to report the first information.

When the communication apparatus 1000 is configured to implement a function of the network device in the method embodiment in FIG. 2, the transceiver module 1010 is configured to receive first information reported by a first terminal device. The first information is used to indicate parameter information of an exception when the first terminal device accesses the first cell, and the first cell is a cell that serves the first terminal device. The processing module 1020 is configured to determine configuration information based on the first information. The configuration information includes configuration information for accessing the first cell. The transceiver module 1010 is further configured to send the configuration information.

When the communication apparatus 1000 is configured to implement a function of the second terminal device in the method embodiment in FIG. 2, the transceiver module 1010 is configured to receive configuration information. The configuration information includes configuration information for accessing a target cell. The target cell is a first cell. The configuration information includes a target transmit power or a target path loss compensation value at which a first terminal device accesses the first cell, or a target start occasion on which the first terminal device reselects or is handed over from a second cell in a second RAT to the first cell in a first RAT or a target network search period in which the first terminal device reselects or is handed over from a second cell in a second RAT to the first cell in a first RAT. A generation of communication in the second RAT is lower than a generation of communication in the first RAT. The processing module 1020 is configured to access the target cell based on the configuration information.

For more detailed descriptions of the transceiver module 1010 and the processing module 1020, refer to related descriptions in the foregoing method embodiments. Details are not described herein again.

As shown in FIG. 8, a communication apparatus 1100 includes a processor 1110 and an interface circuit 1120. The processor 1110 and the interface circuit 1120 are coupled to each other. It may be understood that the interface circuit 1120 may be a transceiver or an input/output interface. Optionally, the communication apparatus 1100 may further include a memory 1130 for storing instructions executed by the processor 1110, or input data required by the processor 1110 to run the instructions, or data generated after the processor 1110 runs the instructions.

When the communication apparatus 1100 is configured to implement the method in the foregoing method embodiments, the processor 1110 is configured to perform functions of the processing module 1020, and the interface circuit 1120 is configured to perform functions of the transceiver module 1010.

When the communication apparatus is a chip used in a terminal device, the chip used in the terminal device implements the function of the terminal device in the foregoing method embodiment. The chip used in the terminal device receives information from another module (for example, a radio frequency module or an antenna) in the terminal device, where the information is sent by a network device to the terminal device. Alternatively, the chip used in the terminal device sends information to another module (for example, a radio frequency module or an antenna) in the terminal device, where the information is sent by the terminal device to a network device.

When the communication apparatus is a chip used in a network device, the chip used in the network device implements the function of the network device in the foregoing method embodiment. The chip used in the network device receives information from another module (for example, a radio frequency module or an antenna) in the network device, where the information is sent by a terminal device to the network device. Alternatively, the chip used in the network device sends information to another module (for example, a radio frequency module or an antenna) in the network device, where the information is sent by the network device to a terminal device.

An embodiment of this disclosure further provides a computer-readable storage medium, configured to store a computer program.

Optionally, the computer-readable storage medium may be applied to the first terminal device or the second terminal device in embodiments of this disclosure, and the computer program enables a computer to perform corresponding procedures implemented by the first terminal device or the second terminal device in the methods in embodiments of this disclosure. For brevity, details are not described herein again.

Optionally, the computer-readable storage medium may be applied to the network device (such as the first network element, the second network element, and the third network element) in embodiments of this disclosure, and the computer program enables a computer to perform corresponding procedures implemented by the network device in the methods in embodiments of this disclosure. For brevity, details are not described herein again.

An embodiment of this disclosure further provides a computer program product, including computer program instructions.

Optionally, the computer program product may be applied to the first terminal device or the second terminal device in embodiments of this disclosure, and the computer program instructions enable a computer to perform corresponding procedures implemented by the first terminal device or the second terminal device in the methods in embodiments of this disclosure. For brevity, details are not described herein again.

Optionally, the computer program product medium may be applied to the network device (such as the first network element, the second network element, and the third network element) in embodiments of this disclosure, and the computer program instructions enable a computer to perform corresponding procedures implemented by the network device in the methods in embodiments of this disclosure. For brevity, details are not described herein again.

Embodiments of this disclosure further provide a computer program.

Optionally, the computer program may be applied to the first terminal device or the second terminal device in embodiments of this disclosure, and when the computer program is run on a computer, the computer is enabled to perform corresponding procedures implemented by the first terminal device or the second terminal device in the methods in embodiments of this disclosure. For brevity, details are not described herein again.

Optionally, the computer program medium may be applied to the network device (such as the first network element, the second network element, and the third network element) in embodiments of this disclosure, and when the computer program is run on a computer, the computer is enabled to perform corresponding procedures implemented by the network device in the methods in embodiments of this disclosure. For brevity, details are not described herein again.

It may be understood that, the processor in embodiments of this disclosure may be a CPU, or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any conventional processor.

The method steps in embodiments of this disclosure may be implemented in a hardware manner, or may be implemented in a manner of executing software instructions by the processor. The software instructions may include a corresponding software module. The software module may be stored in a random-access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in an access network device or a terminal device. Certainly, the processor and the storage medium may exist in the access network device or the terminal device as discrete components.

All or some of the foregoing embodiments may be implemented by using software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or the functions according to embodiments of this disclosure are all or partially implemented. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape, may be an optical medium, for example, a digital versatile disc (DVD), or may be a semiconductor medium, for example, a solid-state disk (SSD).

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

In this disclosure, at least one means one or more, and a plurality of means two or more. The term "and/or" describes an association relationship between associated objects and may indicate three relationships. For example, A and/or B may indicate the following cases: Only A exists, both A and B exist, and only B exists. A and B may be singular or plural. In the text descriptions of this disclosure, the character "/" generally indicates an "or" relationship between the associated objects. In a formula in this disclosure, the character "/" indicates a "division" relationship between the associated objects.

It may be understood that numerical symbols involved in embodiments of this disclosure are differentiated merely for ease of description, but are not used to limit the scope of embodiments of this disclosure. The sequence numbers of the foregoing processes do not mean execution sequences, and the execution sequences of the processes should be determined based on functions and internal logic of the processes.

What is claimed is:

1. A method, comprising:
receiving, by a first network element, first information from a first terminal device, wherein the first information indicates parameter information of an exception when the first terminal device accesses a first cell, and wherein the first cell serves the first terminal device;
determining, by the first network element, configuration information based on the first information, wherein the configuration information comprises configuration information for accessing the first cell, wherein the configuration information comprises a target transmit power or a target path loss compensation value at which the first terminal device accesses the first cell, or wherein the first cell is associated with a first radio access technology (RAT), and wherein the configuration information comprises a target start occasion on which the first terminal device reselects or is handed over from a second cell associated with a second RAT to the first cell or a target network search period in which the first terminal device reselects or is handed over from the second cell to the first cell, wherein when the configuration information comprises the target transmit power, determining the configuration information based on the first information comprises determining, by the first network element, the target transmit power based on an actual transmit power at which the first terminal device successfully accesses the first cell; and sending, by the first network element, the configuration information to a second terminal device.

2. The method of claim 1, wherein a generation of communication technology in the second RAT is lower than a generation of communication technology in the first RAT.

3. The method of claim 1, wherein receiving the first information from the first terminal device comprises receiving, by the first network element, the first information from the first terminal device when an exception condition is met, wherein the exception condition comprises at least one of:
 a quantity of random access attempts made by the first terminal device to access the first cell is greater than or equal to a first threshold;
 the actual transmit power at which the first terminal device accesses the first cell is greater than or equal to a second threshold; or
 a duration in which the first terminal device reselects or is handed over from the second cell associated with the second RAT to the first cell is greater than or equal to a third threshold, wherein the first cell is associated with the first RAT, and
wherein a generation of communication technology in the second RAT is lower than a generation of communication technology in the first RAT.

4. The method of claim 3, wherein the first information comprises at least one of: an identity (ID) of the first cell, a tracking area (TA) of the first cell, a reference signal received power (RSRP) of the first terminal device in the first cell, IDs of a plurality of neighboring cells of the first cell, RSRPs of the first terminal device in the plurality of neighboring cells, a downlink path loss compensation value at which the first terminal device accesses the first cell, a parameter for calculating the downlink path loss compensation value, the actual transmit power, first location information indicating that the first terminal device accesses the first cell, second location information indicating that the first terminal device reselects or is handed over from the second cell associated with the second RAT to the first cell associated with the first RAT, or the duration.

5. The method of claim 1, wherein the configuration information further comprises a target area, and wherein the method further comprises:
 determining, by the first network element, the target area based on an RSRP of the first terminal device in the first cell and an RSRP of the first terminal device in a neighboring cell of the first cell, wherein the target area indicates a problem area in the first cell; and
 determining, by the first network element, the target area based on second location information indicating that the first terminal device reselects or is handed over from the second cell associated with the second RAT to the first cell.

6. The method of claim 1, further comprising performing, by the first network element, an exception report configuration on the first terminal device, wherein the exception report configuration instructs the first terminal device to report the first information to the first network element when an exception condition is met.

7. The method of claim 6, further comprising receiving, by the first network element, a message that a third network element subscribes to the exception report configuration from the first network element.

8. The method of claim 1, wherein the configuration information comprises configuration information for initially accessing the first cell.

9. The method of claim 1, wherein the configuration information further comprises a target area, and wherein the method further comprises:
 determining, by the first network element, the target area based on an reference signal received power (RSRP) of the first terminal device in the first cell and an RSRP of the first terminal device in a neighboring cell of the first cell, wherein the target area indicates a problem area in the first cell; or
 determining, by the first network element, the target area based on second location information indicating that the first terminal device reselects or is handed over from the second cell associated with the second RAT to the first cell.

10. A method, comprising:
receiving, by a first network element, first information from a first terminal device, wherein the first information indicates parameter information of an exception when the first terminal device accesses a first cell, and wherein the first cell serves the first terminal device;
determining, by the first network element, configuration information based on the first information, wherein the configuration information comprises configuration information for accessing the first cell, wherein the configuration information comprises a target transmit power or a target path loss compensation value at which the first terminal device accesses the first cell, or wherein the first cell is associated with a first radio access technology (RAT), and wherein the configuration information comprises a target start occasion on which the first terminal device reselects or is handed over from a second cell associated with a second RAT to the first cell or a target network search period in which the first terminal device reselects or is handed over from the second cell to the first cell,
wherein when the configuration information comprises the target transmit power, the method further comprises:
 sending, by the first network element, a request message to a second network element, wherein the request message requests the second network element to send an actual receive power of a base station corresponding to the first cell when the first terminal device successfully accesses the first cell; and
 receiving, by the first network element, the actual receive power,
wherein determining configuration information based on the first information comprises determining, by the first network element, the target transmit power based on a difference between the actual receive power and an actual transmit power at which the first terminal device accesses the first cell; and
sending, by the first network element, the configuration information to a second terminal device.

11. The method of claim 10, wherein receiving the first information from the first terminal device comprises receiving, by the first network element, the first information from the first terminal device when an exception condition is met, wherein the exception condition comprises at least one of:
- a quantity of random access attempts made by the first terminal device to access the first cell is greater than or equal to a first threshold;
- the actual transmit power at which the first terminal device accesses the first cell is greater than or equal to a second threshold; or
- a duration in which the first terminal device reselects or is handed over from the second cell associated with the second RAT to the first cell is greater than or equal to a third threshold, wherein the first cell is associated with the first RAT, and
- wherein a generation of communication technology in the second RAT is lower than a generation of communication technology in the first RAT.

12. The method of claim 11, wherein the first information comprises at least one of: an identity (ID) of the first cell, a tracking area (TA) of the first cell, a reference signal received power (RSRP) of the first terminal device in the first cell, IDs of a plurality of neighboring cells of the first cell, RSRPs of the first terminal device in the plurality of neighboring cells, a downlink path loss compensation value at which the first terminal device accesses the first cell, a parameter for calculating the downlink path loss compensation value, the actual transmit power, first location information indicating that the first terminal device accesses the first cell, second location information indicating that the first terminal device reselects or is handed over from the second cell associated with the second RAT to the first cell associated with the first RAT, or the duration.

13. The method of claim 10, wherein the configuration information further comprises a target area, and wherein the method further comprises:
- determining, by the first network element, the target area based on an RSRP of the first terminal device in the first cell and an RSRP of the first terminal device in a neighboring cell of the first cell, wherein the target area indicates a problem area in the first cell; and
- determining, by the first network element, the target area based on second location information indicating that the first terminal device reselects or is handed over from the second cell associated with the second RAT to the first cell.

14. The method of claim 10, further comprising performing, by the first network element, an exception report configuration on the first terminal device, wherein the exception report configuration instructs the first terminal device to report the first information to the first network element when an exception condition is met.

15. The method of claim 14, further comprising receiving, by the first network element, a message that a third network element subscribes to the exception report configuration from the first network element.

16. A method, comprising:
- receiving, by a first network element, first information from a first terminal device, wherein the first information indicates parameter information of an exception when the first terminal device accesses a first cell, and wherein the first cell serves the first terminal device;
- determining, by the first network element, configuration information based on the first information, wherein the configuration information comprises configuration information for accessing the first cell, wherein the configuration information comprises a target transmit power or a target path loss compensation value at which the first terminal device accesses the first cell, or wherein the first cell is associated with a first radio access technology (RAT), and wherein the configuration information comprises a target start occasion on which the first terminal device reselects or is handed over from a second cell associated with a second RAT to the first cell or a target network search period in which the first terminal device reselects or is handed over from the second cell to the first cell, wherein when the configuration information comprises the target path loss compensation value, determining the configuration information based on the first information comprises determining, by the first network element, the target path loss compensation value based on a downlink path loss compensation value at which the first terminal device accesses the first cell or a parameter for calculating the downlink path loss compensation value; and
- sending, by the first network element, the configuration information to a second terminal device.

17. The method of claim 16, wherein receiving the first information from the first terminal device comprises receiving, by the first network element, the first information from the first terminal device when an exception condition is met, wherein the exception condition comprises at least one of:
- a quantity of random access attempts made by the first terminal device to access the first cell is greater than or equal to a first threshold;
- an actual transmit power at which the first terminal device accesses the first cell is greater than or equal to a second threshold; or
- a duration in which the first terminal device reselects or is handed over from the second cell associated with the second RAT to the first cell is greater than or equal to a third threshold, wherein the first cell is associated with the first RAT, and
- wherein a generation of communication technology in the second RAT is lower than a generation of communication technology in the first RAT.

18. The method of claim 17, wherein the first information comprises at least one of: an identity (ID) of the first cell, a tracking area (TA) of the first cell, a reference signal received power (RSRP) of the first terminal device in the first cell, IDs of a plurality of neighboring cells of the first cell, RSRPs of the first terminal device in the plurality of neighboring cells, the downlink path loss compensation value at which the first terminal device accesses the first cell, a parameter for calculating the downlink path loss compensation value, the actual transmit power, first location information indicating that the first terminal device accesses the first cell, second location information indicating that the first terminal device reselects or is handed over from the second cell associated with the second RAT to the first cell associated with the first RAT, or the duration.

19. The method of claim 16, wherein the configuration information further comprises a target area, and wherein the method further comprises:
- determining, by the first network element, the target area based on an RSRP of the first terminal device in the first cell and an RSRP of the first terminal device in a neighboring cell of the first cell, wherein the target area indicates a problem area in the first cell; and
- determining, by the first network element, the target area based on second location information indicating that the first terminal device reselects or is handed over from the second cell associated with the second RAT to the first cell.

20. The method of claim 16, further comprising performing, by the first network element, an exception report configuration on the first terminal device, wherein the exception report configuration instructs the first terminal device to report the first information to the first network element when an exception condition is met.

* * * * *